(12) United States Patent
Burke

(10) Patent No.: US 9,186,953 B2
(45) Date of Patent: Nov. 17, 2015

(54) INTAKE ENHANCEMENT SYSTEM FOR VEHICLE

(71) Applicant: Frederico Burke, Alhambra, CA (US)

(72) Inventor: Frederico Burke, Alhambra, CA (US)

( * ) Notice: Subject to any disclaimer, the term of this patent is extended or adjusted under 35 U.S.C. 154(b) by 155 days.

(21) Appl. No.: 14/076,253

(22) Filed: Nov. 10, 2013

(65) Prior Publication Data
US 2014/0069603 A1    Mar. 13, 2014

Related U.S. Application Data

(63) Continuation-in-part of application No. 13/135,062, filed on Jun. 24, 2011.

(51) Int. Cl.
| | |
|---|---|
| *F02M 15/00* | (2006.01) |
| *F25B 27/00* | (2006.01) |
| *B60H 1/00* | (2006.01) |
| *F02B 51/00* | (2006.01) |
| *F01P 3/20* | (2006.01) |
| *F02B 29/04* | (2006.01) |
| *F02M 31/20* | (2006.01) |
| *B60H 1/14* | (2006.01) |

(52) U.S. Cl.
CPC .............. *B60H 1/00028* (2013.01); *F01P 3/20* (2013.01); *F02B 29/0443* (2013.01); *F02B 51/00* (2013.01); *F02M 31/20* (2013.01); *B60H 1/143* (2013.01); *B60H 2001/00307* (2013.01); *Y02T 10/126* (2013.01); *Y02T 10/146* (2013.01)

(58) Field of Classification Search
CPC ....... F01P 7/14; F01P 11/02; F01P 2003/001; F01P 2003/005; F02B 2029/04; F02B 29/0443; F02B 37/0052; F02B 29/0475; F02B 29/0493; F02M 15/06; F02M 31/20; F02M 37/20; F02M 21/00; F02M 13/002; B60H 1/04; B60H 2001/00307; B60H 1/323; B60H 1/00385; B60H 1/143
USPC .......................... 123/540, 541, 542; 62/323.1
See application file for complete search history.

*Primary Examiner* — Stephen K Cronin
*Assistant Examiner* — Syed O Hasan
(74) *Attorney, Agent, or Firm* — Kenneth L. Green; Averill & Green

(57) ABSTRACT

An intake enhancement system for a vehicle includes a chiller bath, a delivery line operatively extended from the chiller bath for tapping at a heat exchanging line of a HVAC system to guide a heat exchanging agent flowing between the chiller bath and the HVAC system, and a cooling line operatively extended from the chiller bath for guiding a cooling agent to flow from the chiller bath toward the internal combustion engine. The chiller bath provides a heat-exchanging place for cooling the cooling agent by the heat exchanging agent. Therefore, the cooling agent is guide to cool the combustion element before the combustion element enters into the internal combustion engine for enhancing an efficiency of the internal combustion engine.

40 Claims, 32 Drawing Sheets

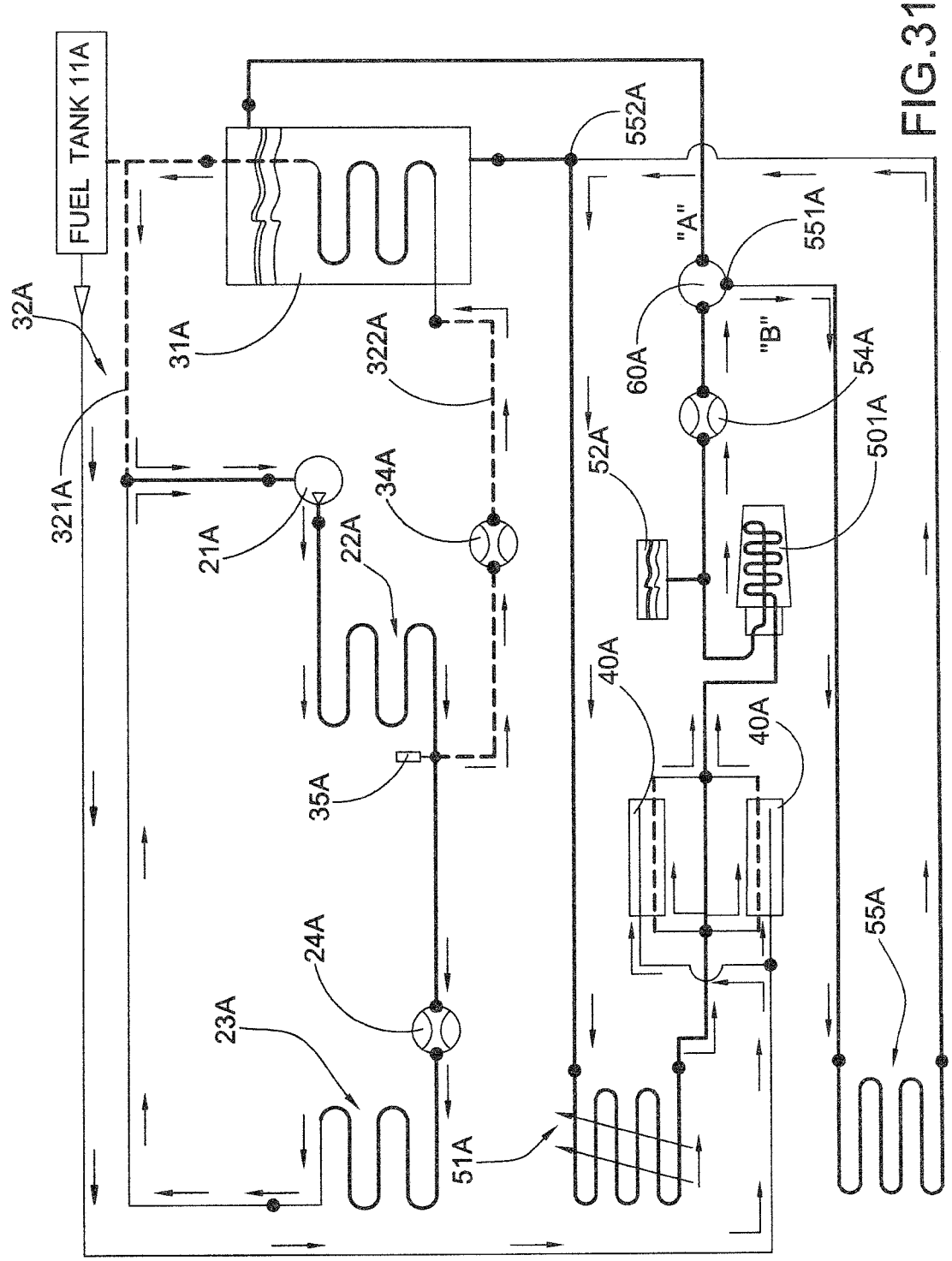

INTAKE ENHANCEMENT SYSTEM FOR VEHICLE

CROSS REFERENCE OF RELATED APPLICATION

This is a Continuation-In-Part application that claims the benefit of priority under 35 U.S.C. §119 to a non-provisional application, application Ser. No. 13/135,062, filed Jun. 24, 2011.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a vehicle fuel system, and more particularly to an intake enhancement system, which substantially cools the air/fuel intake before the air/fuel enters into the internal combustion engine so as to maximize the efficiency of the internal combustion engine.

2. Description of Related Arts

It is a scientific fact that an internal combustion engine operates less efficiently at warmer ambient temperatures. Accordingly, warmer air intake combined with warm fuel creates a potentially lean condition or "vapor lock" that can damage the engine. A cold air intake can cool down the air flow before entering into the internal combustion engine in order to increase engine power and efficiency and to improve throttle response and fuel economy in most cases.

A conventional cold air intake is an external device installed into the vehicle in order to incorporate with the air intake system of the vehicle for increasing the amount of oxygen available for combustion with fuel. Since cooler air has a higher density, cooling the air intake and fuel promotes an increased density of fuel. Denser fuel combined with cold intake air promotes better and more efficient burning of the fuel, so as to generate more power, greater fuel efficiency, and less greenhouse gas emissions.

Generally speaking, the conventional cold air intake comprises a heat shield isolating heat from the engine to the air intake pipe such that airflow can be directly guided to the engine while being heated by the engine. However, the heat shield can only prevent the airflow being heated up by the heat generated from the engine; it does not cool down the airflow before the airflow enters into the engine.

SUMMARY OF THE PRESENT INVENTION

The invention is advantageous in that it provides an intake enhancement system, which substantially cools the air/fuel intake before the air/fuel intake enters into the internal combustion engine so as to maximize the efficiency of the internal combustion engine. Therefore, cooling the air intake and fuel promotes an increased density of fuel, wherein denser fuel combined with cold intake air promotes better and more efficient burning of fuel to consequently generate more power, greater fuel efficiency and less greenhouse gas emissions.

Another advantage of the invention is to provide an intake enhancement system, wherein the combustion element, i.e. the airflow and/or a flow of fuel, is cooled down by the existing air conditioning or the intercooler of the vehicle while being energy efficient.

Another advantage of the invention is to provide an intake enhancement system, wherein the combustion element is guided to flow along the heat exchanging duct of the heat exchanger of the vehicle in a spiral direction for enhancing the heat-exchange between the combustion element and the heat exchanging agent.

Another advantage of the invention is to provide an intake enhancement system, which does not require altering the original structural design of the heat exchanger of the vehicle to incorporate with the intake enhancement system, so as to minimize the installation cost of the present invention to be used in the vehicle.

Another advantage of the invention is to provide an intake enhancement system, which does not involve complicated or expensive mechanical components to minimize the manufacturing cost of the present invention.

Another advantage of the invention is to provide an intake enhancement system, wherein no expensive or complicated mechanical structure is required to be employed in the present invention in order to achieve the above mentioned objects. Therefore, the present invention successfully provides an economical and efficient solution for providing an intake enhancement system to incorporate in any existing vehicle having a heat exchanger in order to cool down the combustion element before the combustion element enters into the internal combustion engine.

Additional advantages and features of the invention will become apparent from the description which follows, and may be realized by means of the instrumentalities and combinations particular point out in the appended claims.

According to the present invention, the foregoing and other objects and advantages are attained by an intake enhancement system for a vehicle which comprises a combustion engine and a heat exchanger for generating a cooling effect. The intake enhancement system comprises an intake cooling unit for delivering a combustion element to the combustion engine, wherein the intake cooling unit is thermally conducted with the heat exchanger for heat-exchanging with the combustion element so as to substantially cool down the combustion element along the intake cooling unit before the combustion element delivers to the combustion engine.

In accordance with another aspect of the invention, the present invention comprises a method of enhancing an efficiency of an internal combustion engine of a vehicle, comprising the following steps:

(1) Guide a combustion element to thermally conduct with a heat exchanging agent of a heat exchanger of the vehicle.

(2) Heat-exchange the combustion element with the heat exchanging agent to cool down the combustion element before entering into the combustion engine.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 31 is flow diagram of the intake enhancement system according to the above third embodiment of the present invention, illustrating the intake enhancement system incorporating with the intercooler, the fuel rail, and the air inlet filter.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1A:
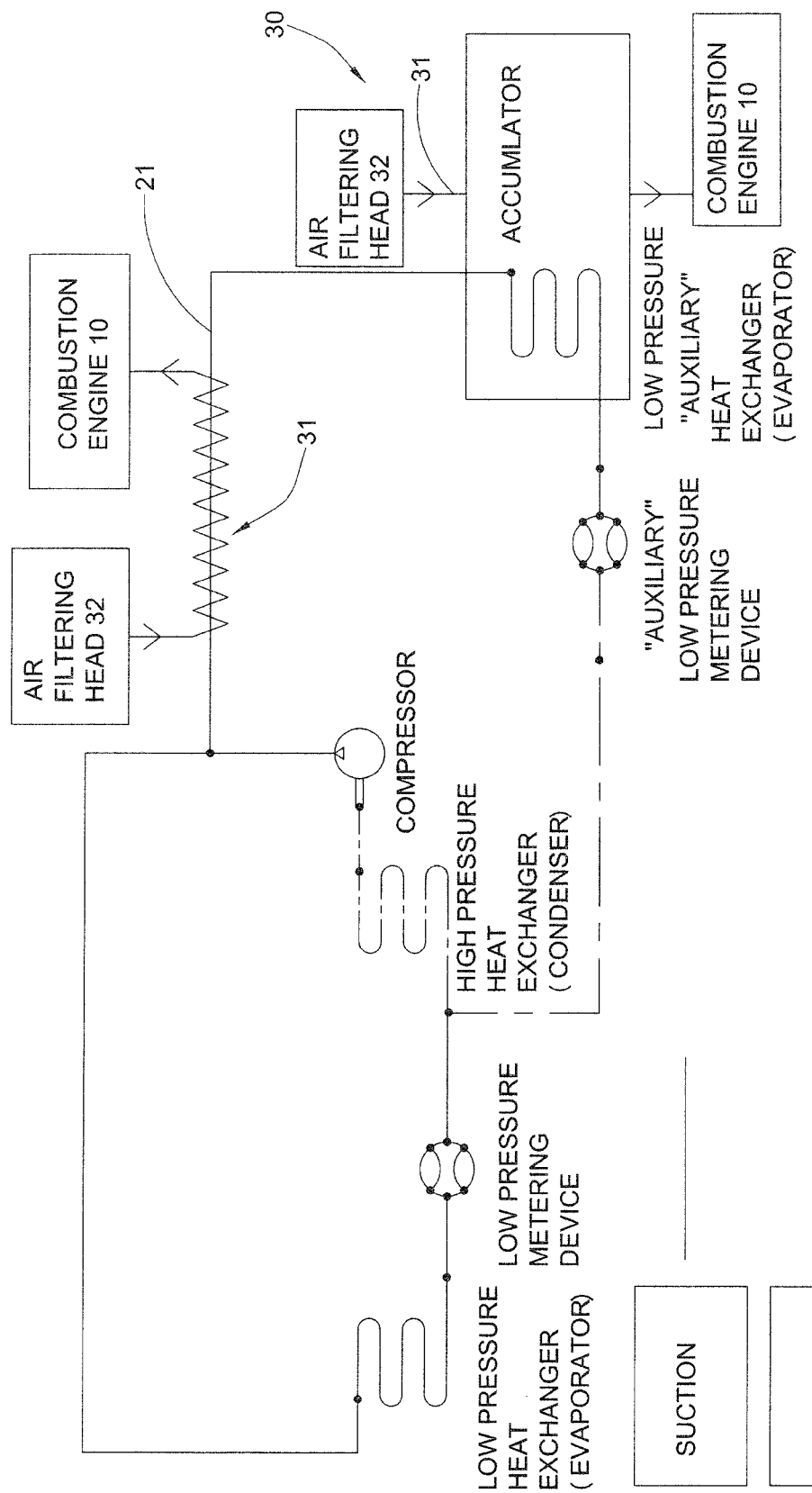
FIG. 1A is flow diagram of an intake enhancement system according to a first preferred embodiment and its alternative of the present invention, illustrating airflow as the combustion element being detoured to heat-exchange with heat exchanger of the vehicle.
Figure 1B:
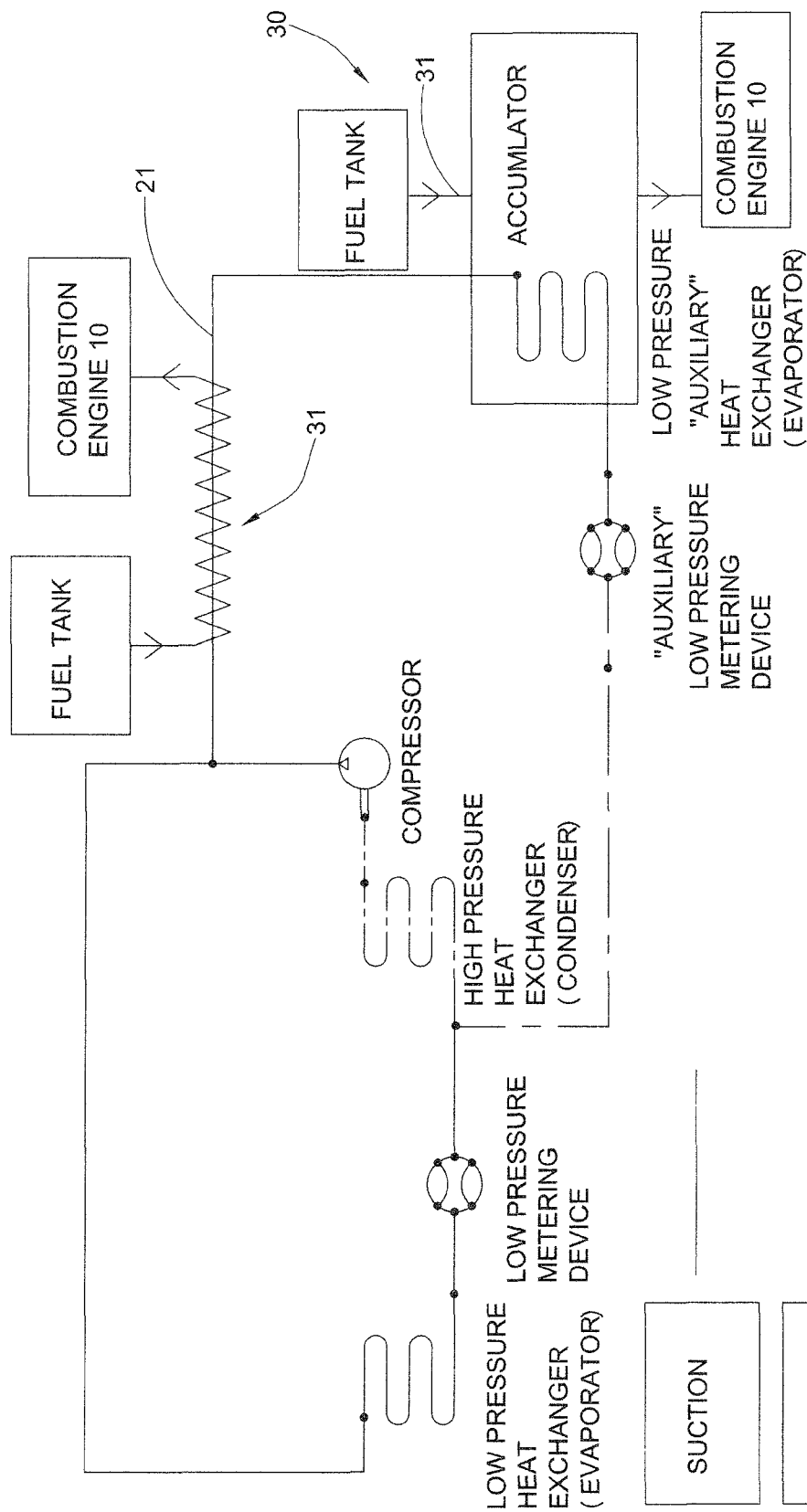
FIG. 1B is flow diagram of an intake enhancement system according to the first preferred embodiment and its alternative of the present invention, illustrating fuel as the combustion element being detoured to heat-exchange with heat exchanger of the vehicle.

Referring to FIGS. 1A and 1B of the drawings, an intake enhancement system for a vehicle according to a preferred embodiment of the present invention is illustrated. Accordingly, the vehicle, such as a car, motorcycle, boat, or truck, generally comprises an internal combustion engine 10 and a heat exchanger 20 for generating a cooling effect.

The heat exchanger 20, which can be an air conditioning system, comprises a compressor, a condenser, an evaporator, and a heat exchanging line 20B operatively connecting the compressor, condenser, and evaporator for guiding a flow of heat exchanging agent, such as refrigerant, among the compressor, condenser, and evaporator for heat exchange. In particular, a heat exchanging duct 21 is formed along the heat exchanging line to operatively link all components of the heat exchanger 20.

The heat exchanger 20 further defines a low pressure side and a high pressure side. The low pressure side of the heat exchanger 20 is defined at the portion of the heat exchanging duct 21 extending from the evaporator to the compressor, wherein the heat exchanging agent is guided to flow along the heat exchanging duct 21 at the low pressure side from the evaporator to the compressor. The high pressure side of the heat exchanger 20 is defined at the portion of the heat exchanging duct 21 extending from the compressor to the evaporator through the condenser, wherein the heat exchanging agent is guided to flow along the heat exchanging duct 21 at the high pressure side from the compressor to the evaporator through the condenser. In particular, the heat exchanger 20 further defines a suction section 20B' and a discharge section 20B' as shown in FIGS. 1A and 1B.

Accordingly, for some vehicles, especially for heavy duty trucks or luxury car, the heat exchanger 20 further comprises an auxiliary heat exchanger for enhancing the cooling effect of the main heat exchanger. The intake enhancement system of the present invention is adapted to incorporate with the heat exchanger 20, including the main heat exchanger and the auxiliary heat exchanger, in order to cool down the combustion element before entering into the combustion engine 10. The combustion element is airflow and/or a flow of fuel delivering to the combustion engine 10 for combustion.

The heat exchanger 20 can also be embodied as an intercooler of the vehicle, wherein the intercooler is an air-to-air or air-to-liquid heat exchange device for internal combustion engine 10 of the vehicle to improve the volumetric efficiency thereof.

According to the preferred embodiment, the intake enhancement system comprises an intake cooling unit 30 for delivering the combustion element to the combustion engine 10, wherein the intake cooling unit 30 is thermally conducted with the heat exchanger 20 for heat-exchanging with the combustion element so as to substantially cool down the combustion element along the intake cooling unit 30 before the combustion element delivers to the combustion engine 10.

It is worth mentioning that the combustion element for the combustion engine 10 is a mixture of airflow and fuel. The airflow is drawn into the combustion engine 10 along an air intake line of the vehicle. The fuel is guided to flow from a fuel tank to the combustion engine 10 along a fuel intake line of the vehicle. Accordingly, there are two ways to heat-exchange the combustion element with the heat exchanging agent. First, the flow of combustion element is detoured to the heat exchanger 20 as illustrated in the first embodiment. Second, as an alternative, the flow of heat exchanging agent is detoured from the heat exchanger 20 to heat-exchange with the combustion element as illustrated in the second embodiment.

Figure 7:
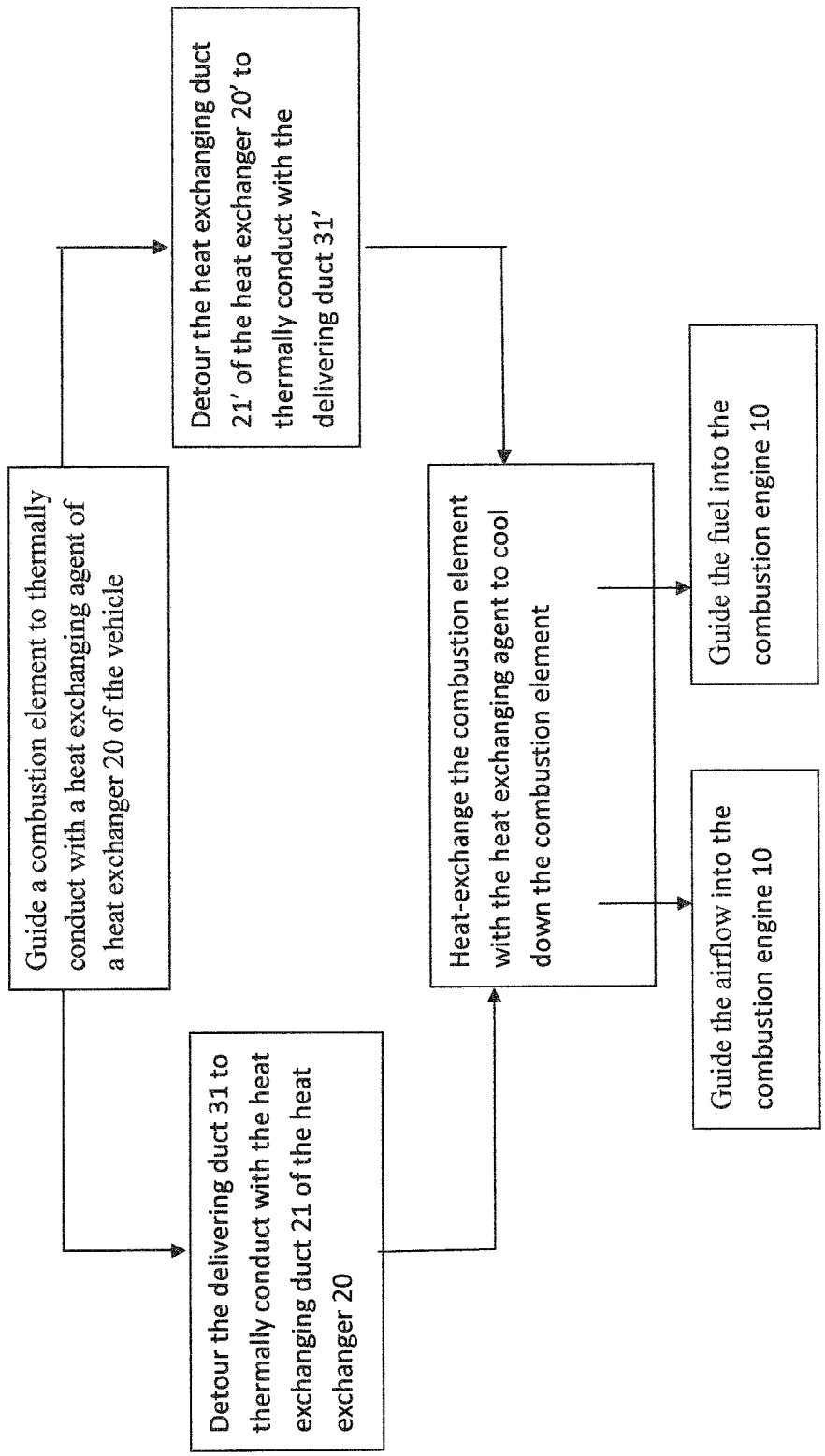
FIG. 7 is a flow diagram illustrating the method of enhancing an efficiency of the internal combustion engine of the vehicle by the intake enhancement system according to the above first and second embodiments of the present invention.

As shown in FIG. 7, the present invention further comprises a method of enhancing an efficiency of the internal combustion engine 10 of the vehicle, which comprises the following steps.

(A) Guide the combustion element to thermally conduct with the heat exchanging agent of the heat exchanger 20 of the vehicle.

(B) Heat-exchange the combustion element with the heat exchanging agent to cool down the combustion element before entering into the combustion engine 10.

As shown in FIGS. 1A and 1B, the intake cooling unit 30 comprises a delivering duct 31 for guiding the combustion element to the combustion engine 10, wherein the delivering duct 31 is directly contacted with the heat exchanging duct 21 to thermally conduct the combustion element with the heat exchanging agent. In other words, the combustion element is detoured to the AC line in order to cool down the combustion element.

Accordingly, the delivering duct 31 is detoured to the heat exchanger 20 to thermally conduct with the heat exchanging duct 21 of the heat exchanger 20 before operatively extending to the combustion engine 10, such that when the combustion element passes along the delivering duct 31, the combustion element is heat-exchanged with the heat exchanging agent within the heat exchanging duct 21 before entering into the combustion engine 10.

According to the preferred embodiment, when the combustion element is guided to flow along the delivering duct 31 in the step (A) and the heat exchanging agent is guided to flow along the heat exchanging duct 21, the combustion element will heat-exchange with the heat exchanging agent through the thermal conduction between the delivering duct 31 and the heat exchanging duct 21. Furthermore, the flowing direction of the combustion element is opposite to the flowing direction of the heat exchanging agent. It is worth mentioning that the delivering duct 31 is extended along the heat exchanging duct 21 at the low pressure side of the heat exchanger 20 for safety purpose. In other words, the combustion element is guided to thermally conduct with the heat exchanging agent at the low pressure side of the heat exchanger 20. In particular, the delivering duct 31 is extended along the heat exchanging duct 21 at the suction section of the heat exchanger 20.

In particular, the delivering duct 31 is integrated into the suction section of the heat exchanger 20 for delivering cold intake air and fuel to the combustion engine 10.

For enhancing the heat-exchange between the combustion element and the heat exchanging agent in the step (B), the combustion element is guided to flow along the delivering duct 31 in a flow-directing manner to thermally conduct with the heat exchanging agent along the heat exchanging duct 21 in the step (A). Accordingly, the combustion element is guided to preferably flow along the delivering duct 31 in a spiral direction to thermally conduct with the heat exchanging agent along the heat exchanging duct 21.

Figure 2:
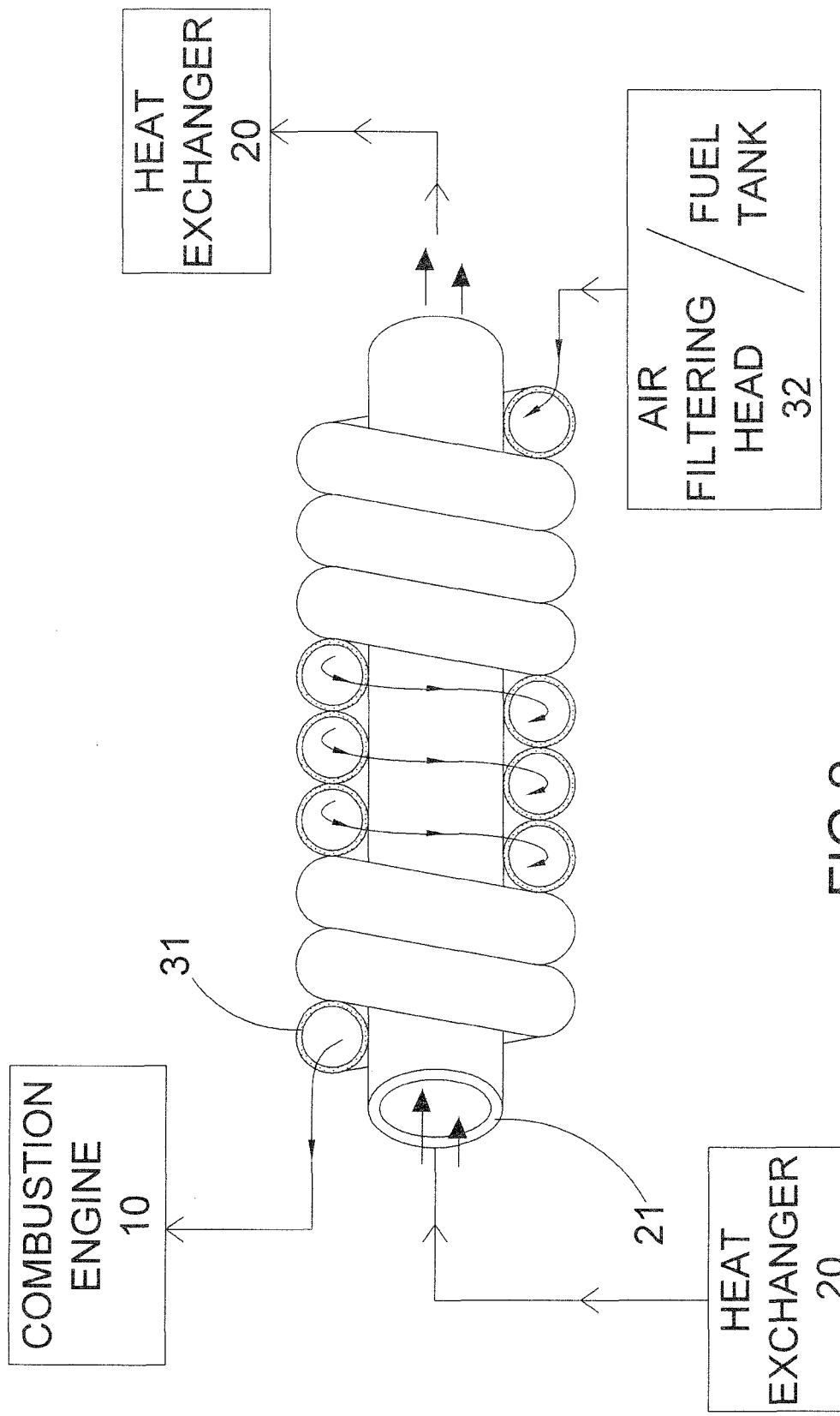
FIG. 2 is a perspective view of a delivering duct of the intake enhancement system according to the above first preferred embodiment of the present invention, illustrating the delivering duct directly extended along the heat exchanging duct in a spiral configuration.

In order to guide the combustion element to flow in a spiral direction, the delivering duct 31 is spirally extended along the heat exchanging duct 21, as shown in FIG. 2, such that the combustion element flows along the delivering duct 31 to heat-exchange the heat exchanging agent. In other words, the delivering duct 31 is directly extended along the heat exchanging duct 21 in a spiral configuration.

Figure 3:
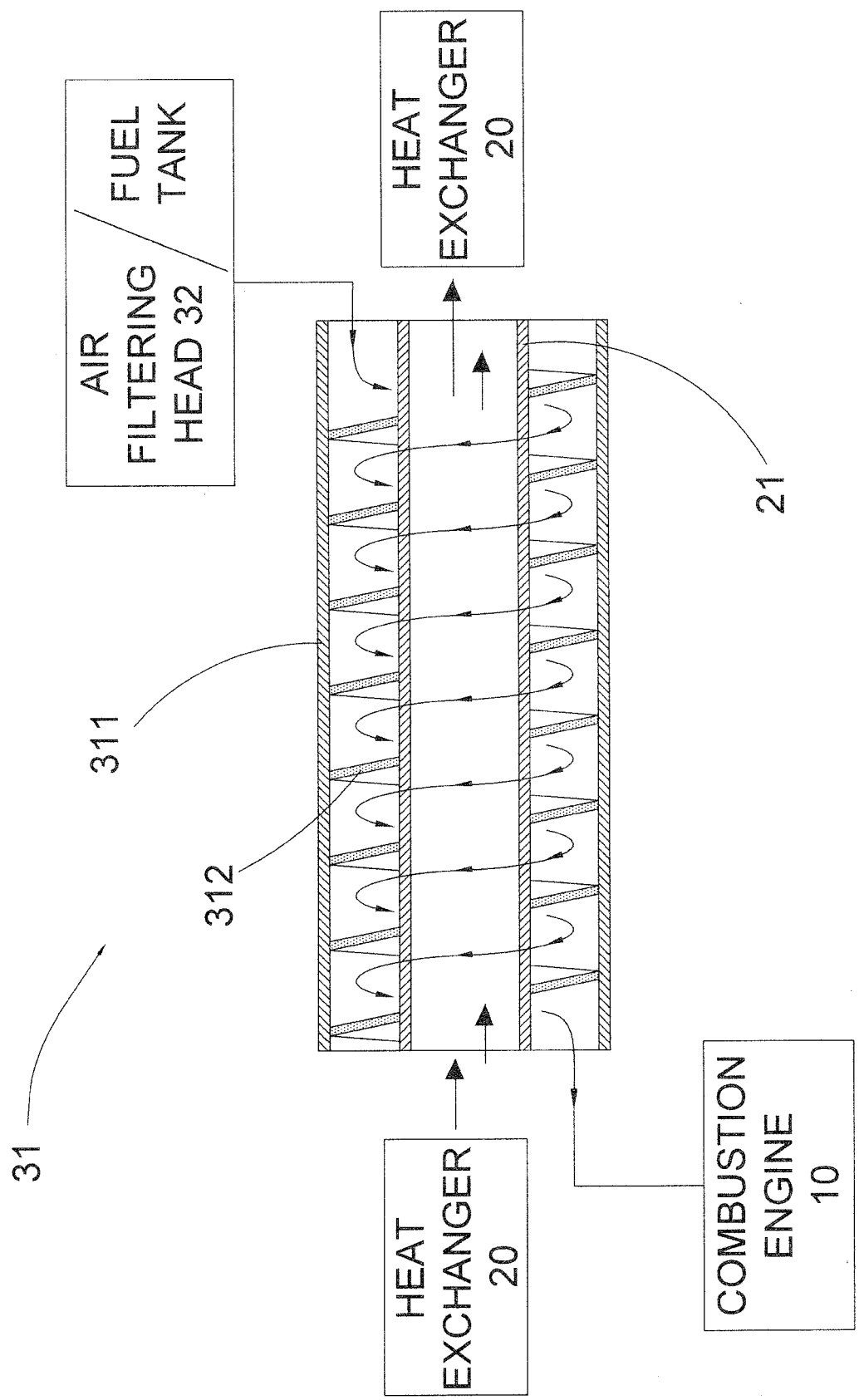
FIG. 3 illustrates an alternative mode of the delivering duct of the intake enhancement system according to the above first preferred embodiment of the present invention, illustrating the delivering duct and the heat exchanging duct in tube-in-tube configuration.

Alternatively, the delivering duct 31 comprises a tubular duct body 311 for encircling the heat exchanging duct 21 therewithin and a guiding fin 312 spirally extended at an inner surface of the duct body 311 for guiding the combustion element passing along the duct body 311 in a spiral direction so as to effectively heat-exchange with the heat exchanging agent by increasing the contact surface area, as shown in FIG. 3. In other words, the delivering duct 31 and the heat exchanging duct 21 form a tube-in-tube configuration.

It is appreciated that the combustion element and the heat exchanging agent are guided to flow into a baffle in vessel structure, wherein the heat exchanging agent is guided to flow at an inner vessel while the combustion element is guided to flow at an outer vessel while baffles thereat to guide the flow direction of the combustion element. Therefore, prolonging the flow of the combustion element within the vessel, the combustion element can be efficiently heat-exchanged with the heat exchanging agent.

For airflow cooling configuration, the combustion element is embodied as the airflow being cooled down by the heat exchanger 20 before the airflow enters into the combustion engine 10. In other words, the delivering duct 31 is an air delivering duct to guide the airflow. The existing air intake system generally comprises an air filtering head 32 for drawing ambient air into the combustion engine 10 along the air intake line. Accordingly, the delivering duct 31 is tapped to the air intake line to detour the airflow between the air filtering head 32 and the combustion engine 10. In other words, the airflow will guide to pass through the delivering duct 31 from the air filtering head 32 to the combustion engine 10. In other words, the first end of the delivering duct 31 is coupled with the air filtering head 32 for the ambient air to enter into the delivering duct 31, while the second end of the delivering duct 31 is operatively extended to the combustion engine. Therefore, the airflow is guided to enter into the delivering duct 31 through the air filtering head 32 and is then cooled down by heat-exchanging with the heat exchanging agent before the airflow enters into the combustion engine 10, as shown in FIG. 1A.

Alternatively, the heat exchanger 20 further comprises an accumulator for use in a refrigeration circuit for vehicle air conditioning system, wherein the accumulator comprises a reservoir containing the heat exchanging agent, i.e. refrigerant. The heat exchanging agent passes from the evaporator to the accumulator to separate any remaining liquid heat exchanging agent from the gaseous heat exchanging agent, and to allow gaseous heat exchanging agent to return to the compressor.

The delivering duct 31, i.e. the air delivering duct, is detoured from the air intake line and is extended through the accumulator, wherein the delivering duct 31 is returned back to the air intake line. Therefore, the airflow is guided to enter into the delivering duct 31 and is then cooled down by heat-exchanging with the heat exchanging agent within the accumulator before the airflow enters into the combustion engine 10, as shown in FIG. 1A.

For fuel cooling configuration, the combustion element is embodied as the flow of fuel being cooled down by the heat exchanger 20 along the fuel intake line before the fuel enters into the combustion engine 10. Accordingly, the delivering duct 31 is a fuel delivering duct to guide the flow of fuel, wherein the delivering duct 31 is extended from the fuel tank to the combustion engine 10 through the heat exchanger 20, as shown in FIG. 1B.

Accordingly, the delivering duct 31 is tapped to the fuel intake line to detour the airflow between the fuel tank and the combustion engine 10. In other words, the fuel will guide to pass through the delivering duct 31 from the fuel tank to the combustion engine 10. In other words, the first end of the delivering duct 31 is coupled with the fuel tank for the fuel to enter into the delivering duct 31, while the second end of the delivering duct 31 is operatively extended to the combustion engine. Therefore, the fuel is guided to enter into the delivering duct 31 from the fuel tank and is then cooled down by heat-exchanging with the heat exchanging agent before the airflow enters into the combustion engine 10, as shown in FIG. 1B.

Alternatively, the delivering duct 31, i.e. the fuel delivering duct, is detoured from the fuel intake line and is extended through the accumulator, wherein the delivering duct 31 is returned back to the fuel intake line. Therefore, the fuel is guided to enter into the delivering duct 31 and is then cooled down by heat-exchanging with the heat exchanging agent within the accumulator before the fuel enters into the combustion engine 10, as shown in FIG. 1B.

It is appreciated that two delivering ducts 31 are configured as the air delivering duct and the fuel delivering duct respectively to guide the airflow and fuel to the combustion engine 10 through the heat exchanger 20. In other words, both airflow and fuel will be cooled down before the airflow and fuel enter into the combustion engine 10. Therefore, by cooling the air intake and fuel promotes an increased density of fuel, wherein denser fuel combined with cold intake air promotes better and more efficient burning of fuel so as to consequently generate more power, greater fuel efficiency and less greenhouse gas emissions.

Figure 4A:
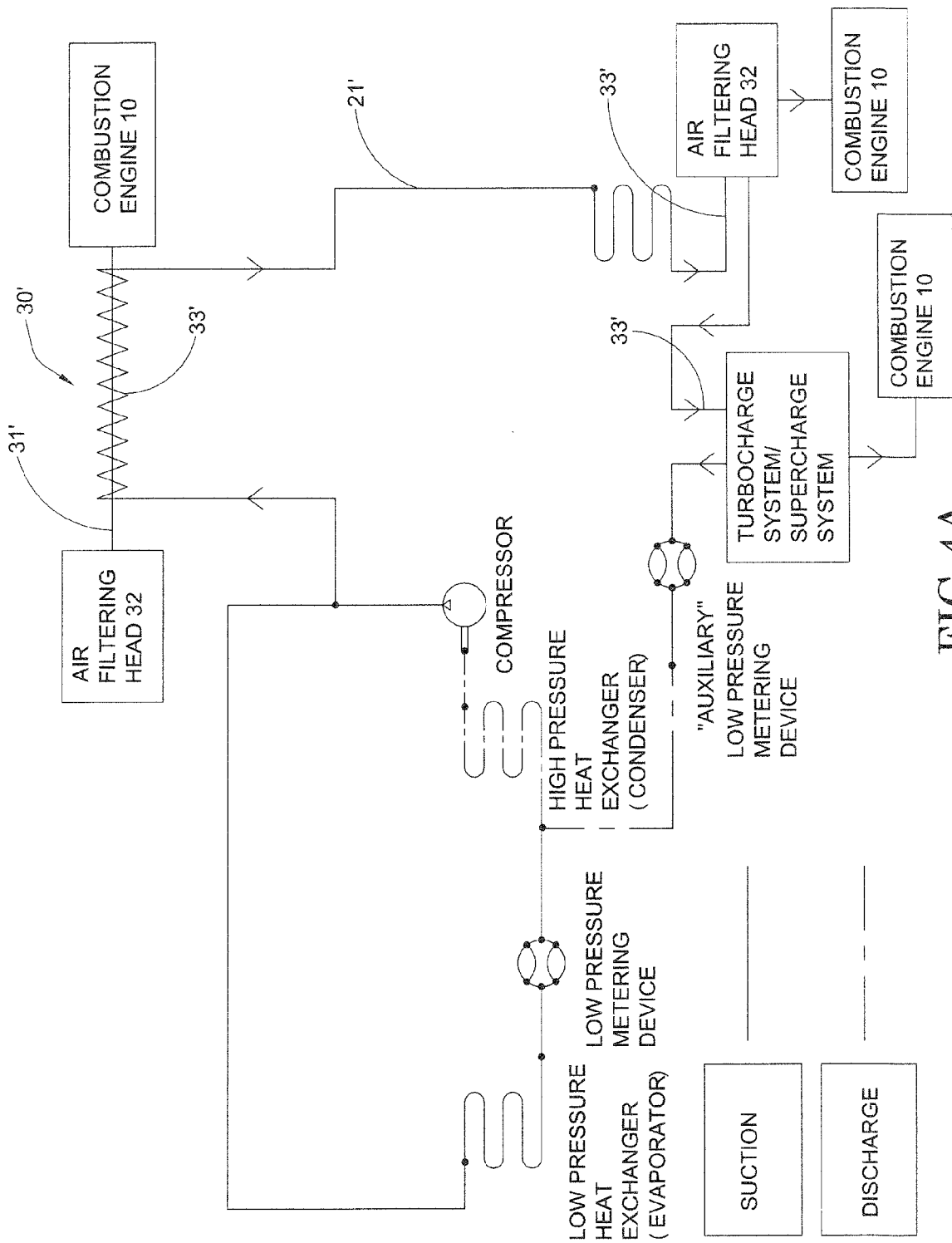
FIG. 4A is flow diagram of an intake enhancement system according to a second preferred embodiment and its alternative of the present invention, illustrating the heat exchanging agent being detoured to heat-exchange with airflow as the combustion element.
Figure 4B:
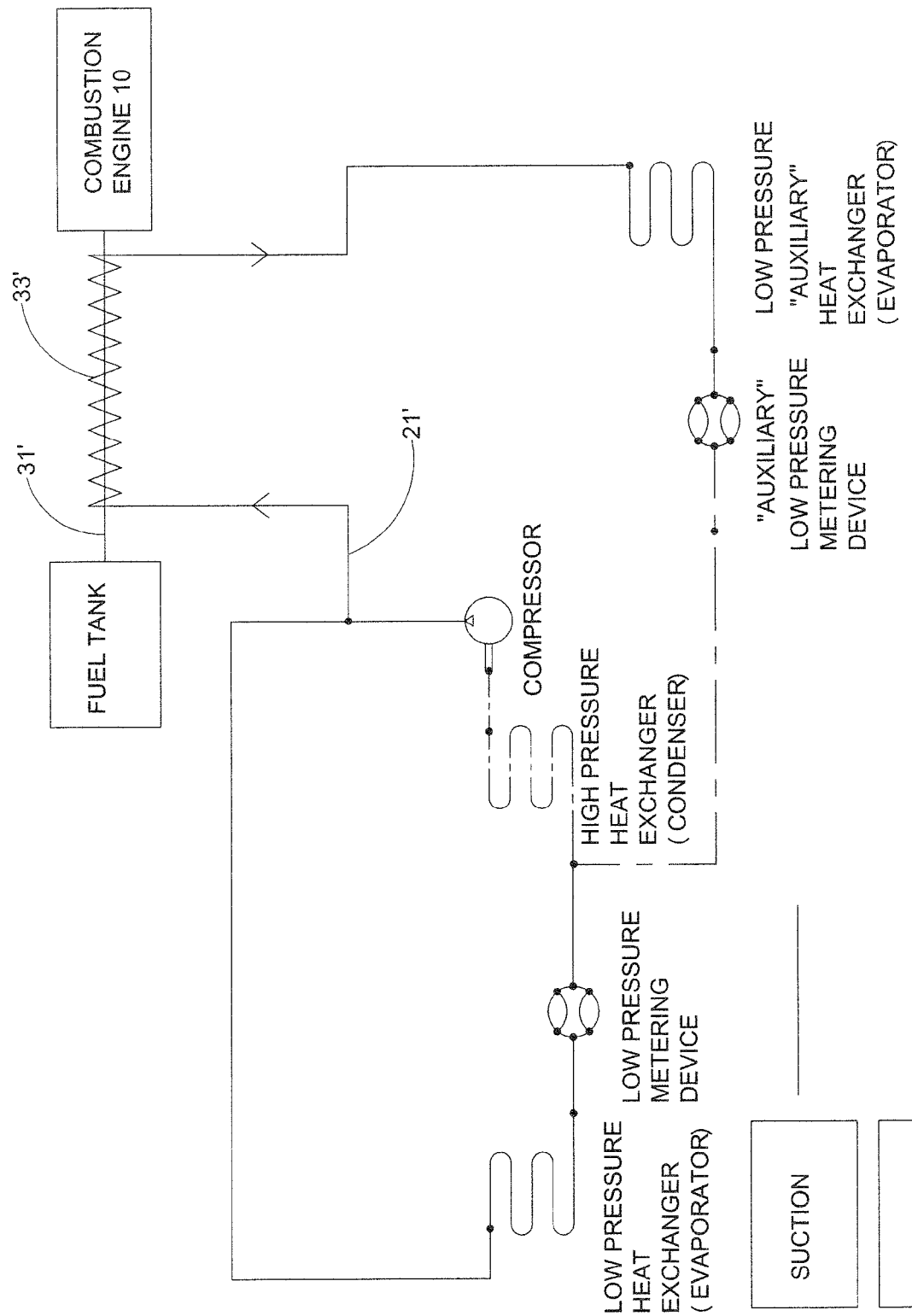
FIG. 4B is flow diagram of an intake enhancement system according to a second preferred embodiment and its alternative of the present invention, illustrating the heat exchanging agent being detoured to heat-exchange with fuel as the combustion element.

As shown in FIGS. 4A and 4B, an intake enhancement system according to a second embodiment illustrates an alternative mode of the present invention, wherein the structural configuration of the intake cooling unit 30' according to the second embodiment is the same as that of the first embodiment, expect the heat exchanger 20' is tapped to detour the heat exchanging agent to cool down the combustion element. In other words, the heat exchanging agent is detoured from its AC (air conditioning) line to cool down the combustion element.

According to the second embodiment, in order to detour the heat exchanging agent, the intake cooling unit 30' further comprises a cooling extension duct 33' for operatively extending from the heat exchanging duct 21' to detour a flow of the heat exchanging agent, wherein the cooling extension duct 33' can be spirally extended along the delivering duct 31' to heat-exchange the combustion element with the heat exchanging agent.

The cooling extension duct 33' has two ends operatively coupled with a suction section of the heat exchanging duct 21' especially at the low pressure side of the heat exchanger 20'. Instead of directly guiding the heat exchanging agent to flow along the heat exchanging duct 21', the heat exchanging agent is guided to detour from the heat exchanging duct 21' to the cooling extension duct 33' and is then guided to flow back to the heat exchanging duct 21'.

The combustion element will heat-exchange with the heat exchanging agent through the thermal conduction between the delivering duct 31' and the cooling extension duct 33'. Furthermore, the flowing direction of the combustion element is opposite to the flowing direction of the heat exchanging agent.

Figure 5:
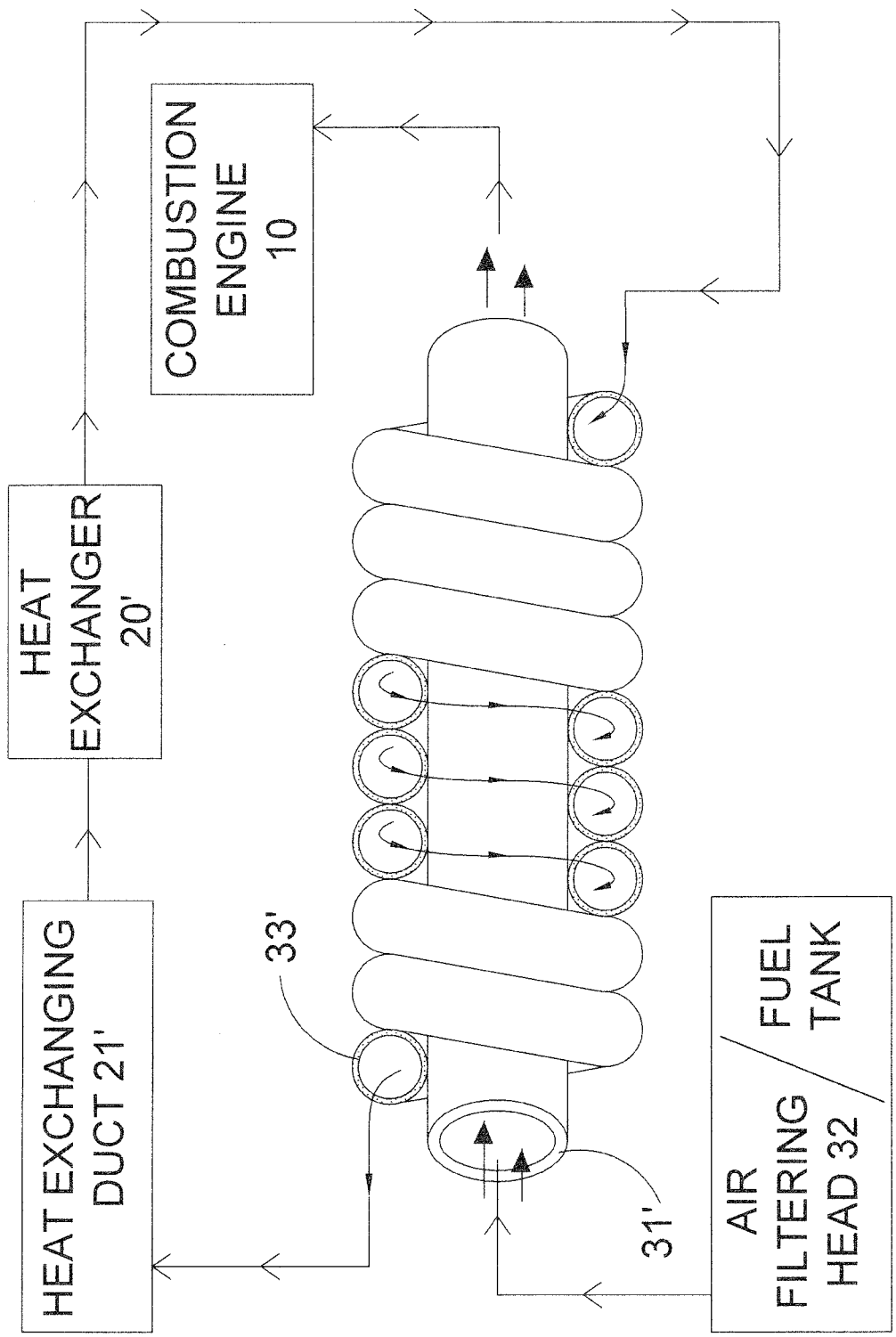
FIG. 5 is a perspective view of the cooling extension duct of the intake enhancement system according to the above second preferred embodiment of the present invention, illustrating the cooling extension duct directly extended along the delivering duct in a spiral configuration.
Figure 6:
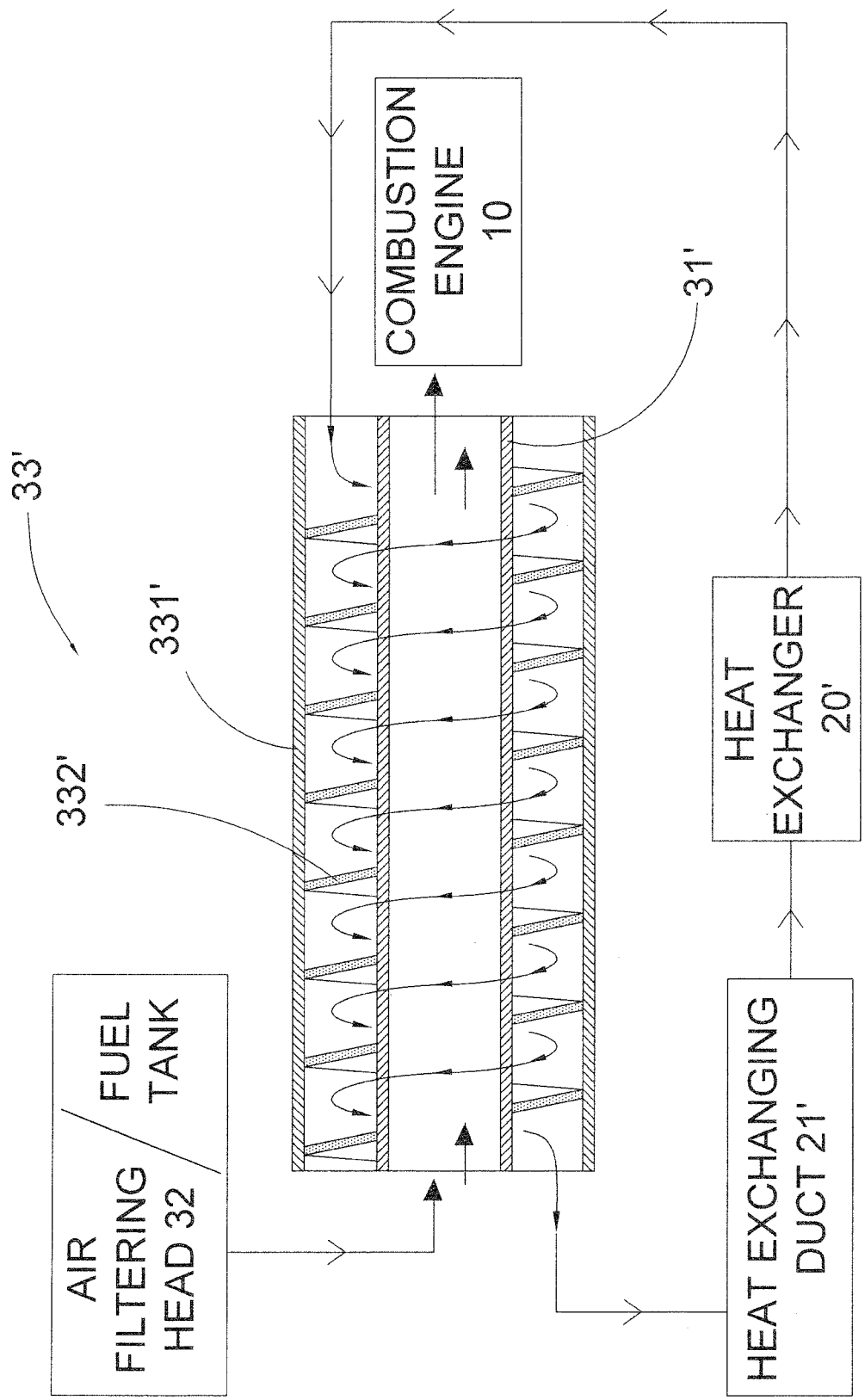
FIG. 6 illustrates an alternative mode of the cooling extension duct of the intake enhancement system according to the above second preferred embodiment of the present invention, illustrating the cooling extension duct and the delivering duct in tube-in-tube configuration.

Accordingly, the heat exchanging agent is guided to flow along the cooling extension duct 33' in a spiral direction to thermally conduct with the combustion element along the delivering duct 31'. As shown in FIG. 5, the cooling extension duct 33' is directly extended along the delivering duct 31' in a spiral configuration. Alternatively, the comprises a tubular duct body 331' for encircling the delivering duct 31' therewithin and a guiding fin 332' spirally extended at an inner surface of the duct body 331' for guiding the heat exchanging agent passing along the duct body 331' in a spiral direction so as to effectively heat-exchange with the combustion element, as shown in FIG. 6. In other words, the delivering duct 31' and the cooling extension duct 33' form a tube-in-tube configuration. Alternatively, the combustion element and the heat exchanging agent are guided to flow into a baffle in vessel structure, wherein the heat exchanging agent is guided to flow at an inner vessel while the combustion element is guided to flow at an outer vessel while baffles thereat to guide the flow direction of the combustion element.

Therefore, prolonging the flow of the combustion element within the vessel, the combustion element can be efficiently heat-exchanged with the heat exchanging agent.

For airflow cooling configuration, the combustion element is embodied as the airflow being cooled down by the heat exchanger 20' before the airflow enters into the combustion engine 10. In other words, the delivering duct 31' is an air delivering duct to guide the airflow. Accordingly, the cooling extension duct 33' is tapped to extend to the air delivering duct, wherein when the airflow is guided to pass through the air delivering duct 31' from the air filtering head 32 to the combustion engine 10, the airflow will be cooled down by the heat exchanging agent by heat-exchanging between the air delivering duct 31' and the cooling extension duct 33'. Therefore, the airflow is guided to enter into the delivering duct 31' from the air filtering head 32 and is then cooled down by heat-exchanging with the heat exchanging agent before the airflow enters into the combustion engine 10, as shown in FIG. 4A.

Alternatively, the cooling extension duct 33' is directly extended to the air filtering head 32, wherein when the air enters into the air filtering head 32, the air will be directly cooled down by the heat exchanging agent passing through the cooling extension duct 33' before entering into the combustion engine 10, as shown in FIG. 4A.

For fuel cooling configuration, the combustion element is embodied as the flow of fuel being cooled down by the heat exchanger 20' along the fuel intake line before the fuel enters into the combustion engine 10. Accordingly, the delivering duct 31' is a fuel delivering duct to guide the flow of fuel, wherein the delivering duct 31' is extended from the fuel tank to the combustion engine 10 through the heat exchanger 20', as shown in FIG. 4B.

Accordingly, the cooling extension duct 33' is tapped to extend to the fuel delivering duct, wherein when the fuel is guided to pass through the fuel delivering duct 31' from the fuel tank to the combustion engine 10, the fuel will be cooled down by the heat exchanging agent by heat-exchanging between the fuel delivering duct 31' and the cooling extension duct 33'. Therefore, the fuel is guided to enter into the fuel delivering duct 31' from the fuel tank and is then cooled down by heat-exchanging with the heat exchanging agent before the fuel enters into the combustion engine 10, as shown in FIG. 4B.

It is worth mentioning that the intake cooling unit 30' can also incorporated the vehicle having the turbocharge system and supercharge system. Accordingly, for turbocharge configuration, the cooling extension duct 33' is tapped to extend to the turbocharge system, wherein the heat exchanging agent is guided to flow to the turbocharge system in order to cool down the air being drawn by the turbocharge system.

For supercharge configuration, the cooling extension duct 33' is tapped to extend to a chiller unit of the supercharge system, wherein the heat exchanging agent is guided to flow to the chiller unit of the supercharge system. It is worth mentioning that the heat exchanging agent is detoured to flow along the cooling extension duct 33' to cool the liquid, such as glycol, within the chiller unit so as to further cool down the air being cooled by the chiller. In other words, the liquid in the chiller will be further cooled to cool down the airflow efficiently.

Figure 8:
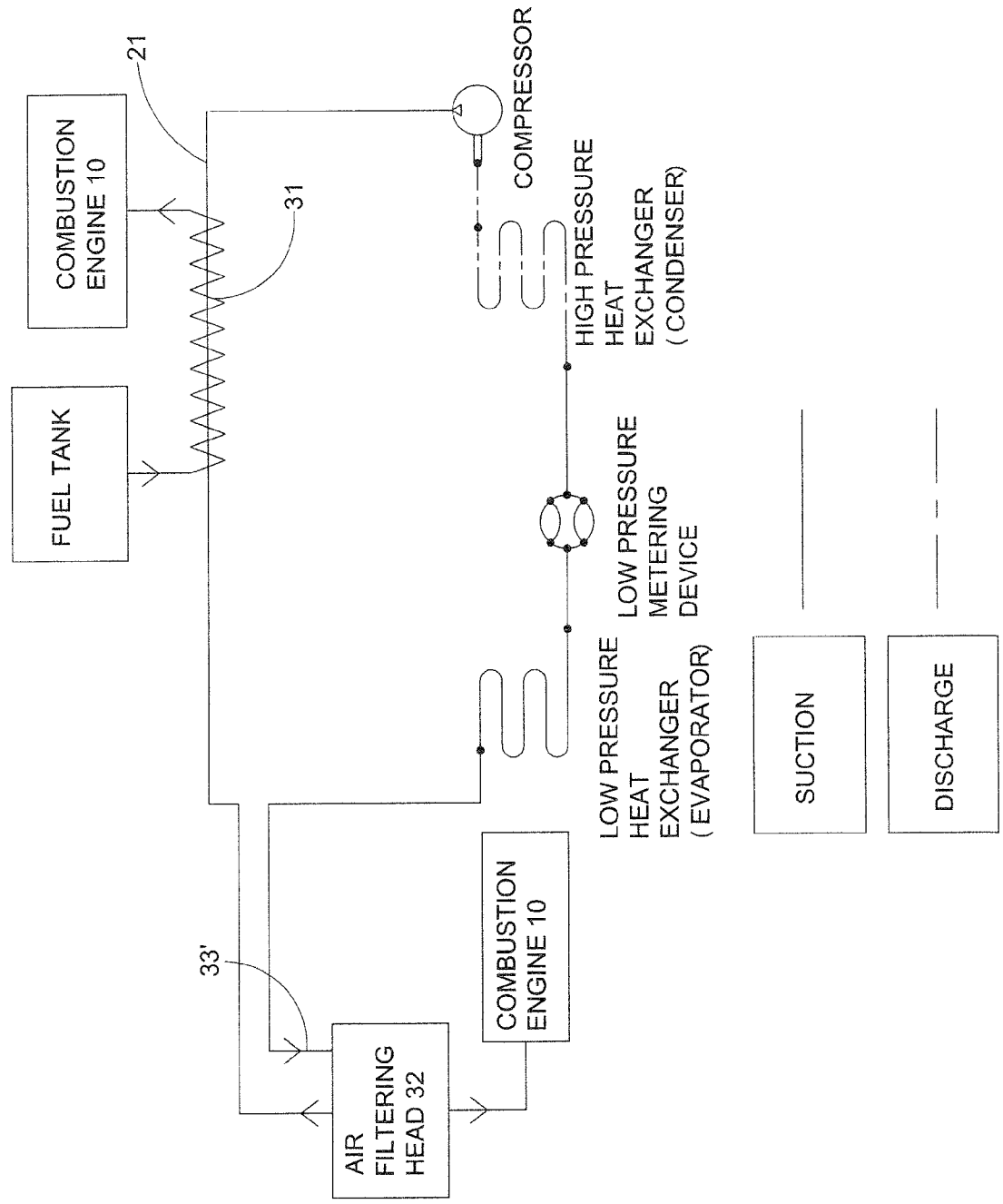
FIG. 8 is flow diagram of an intake enhancement system illustrating both airflow and fuel being cooled by the intake enhancement system before delivering to the combustion engine.

For best configuration, both airflow and fuel will be cooled before entering into the combustion engine 10 as shown in FIG. 8. Accordingly, the cooling extension duct 33' is directly extended to the air filtering head 32 to directly cool down the airflow drawn at the air filtering head 32. In the meantime, the delivering duct 31 is tapped to the fuel intake line to detour the fuel between the fuel tank and the combustion engine 10.

Therefore, the fuel is guided to pass through the delivering duct 31 from the fuel tank to the combustion engine 10 to heat-exchange with the heat exchanging agent within the heat exchanging duct 21. The fuel is then cooled down before the fuel enters into the combustion engine 10.

Therefore, both airflow and fuel will be cooled before entering into the combustion engine 10. It is worth mentioning that a safety valve, such as a low pressure valve, can be incorporated with the intake cooling unit 30, 30' for modulating the pressure, wherein the safety valve is automatically shut off in responsive to the pressure, in order to prevent the combustion element being cooled below its freezing point.

It is worth mentioning that the intake cooling unit 30 can also firstly cool down the fuel before entering into the combustion engine 10, while the cold fuel can then be detoured to cool the airflow before entering into the combustion engine 10. In other words, the fuel and airflow will be subsequently cooled by the intake cooling unit 30. It is appreciated that the intake cooling unit 30 will cool the airflow first and the cold airflow will then cool the fuel in order to subsequently cool the airflow and the fuel before entering into the combustion engine 10.

Figure 9:
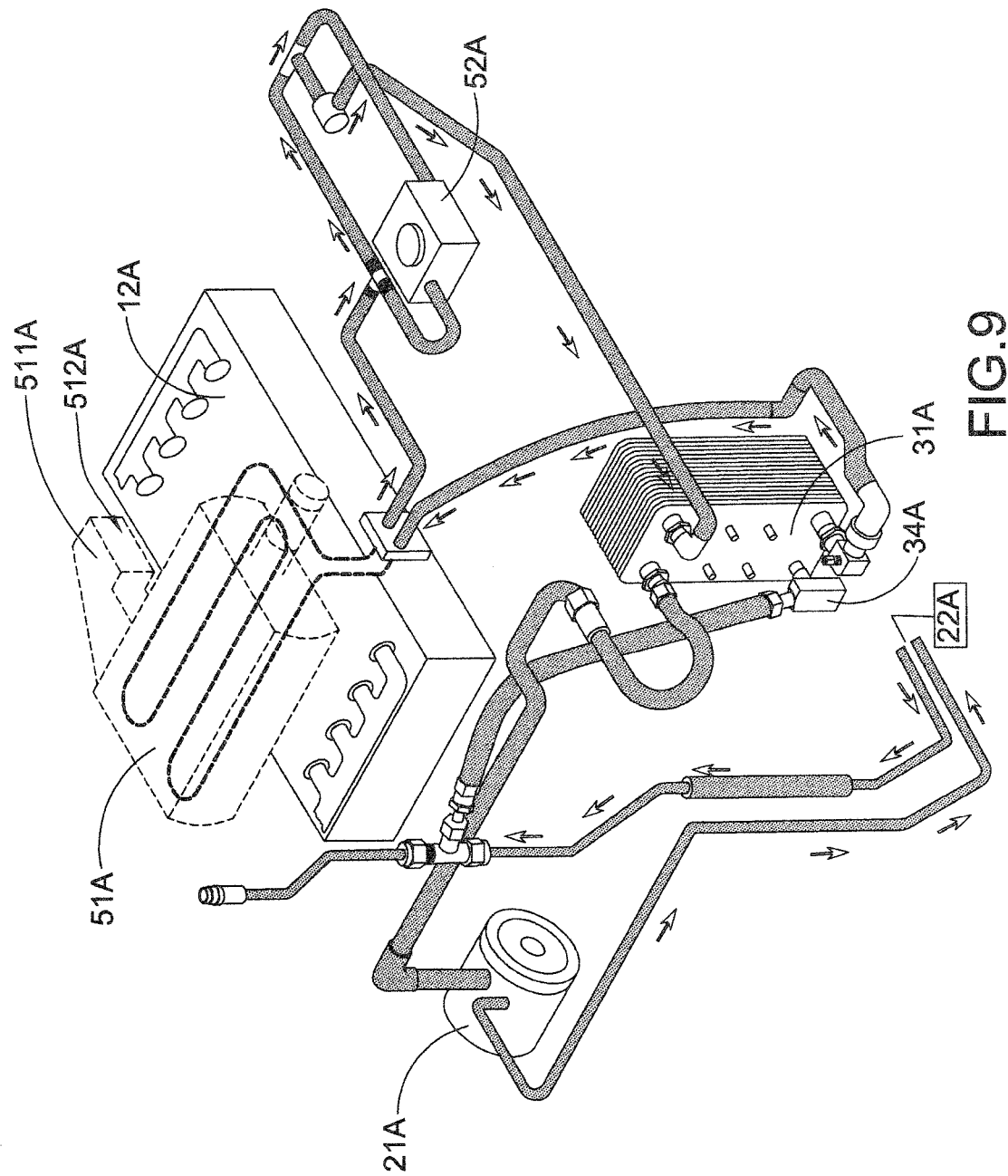
FIG. 9 is a schematic view of an intake enhancement system incorporating an automotive HVAC (Heating, Ventilation, and Air-Conditioning) system for a vehicle according to a third embodiment of the present invention.
Figure 11:
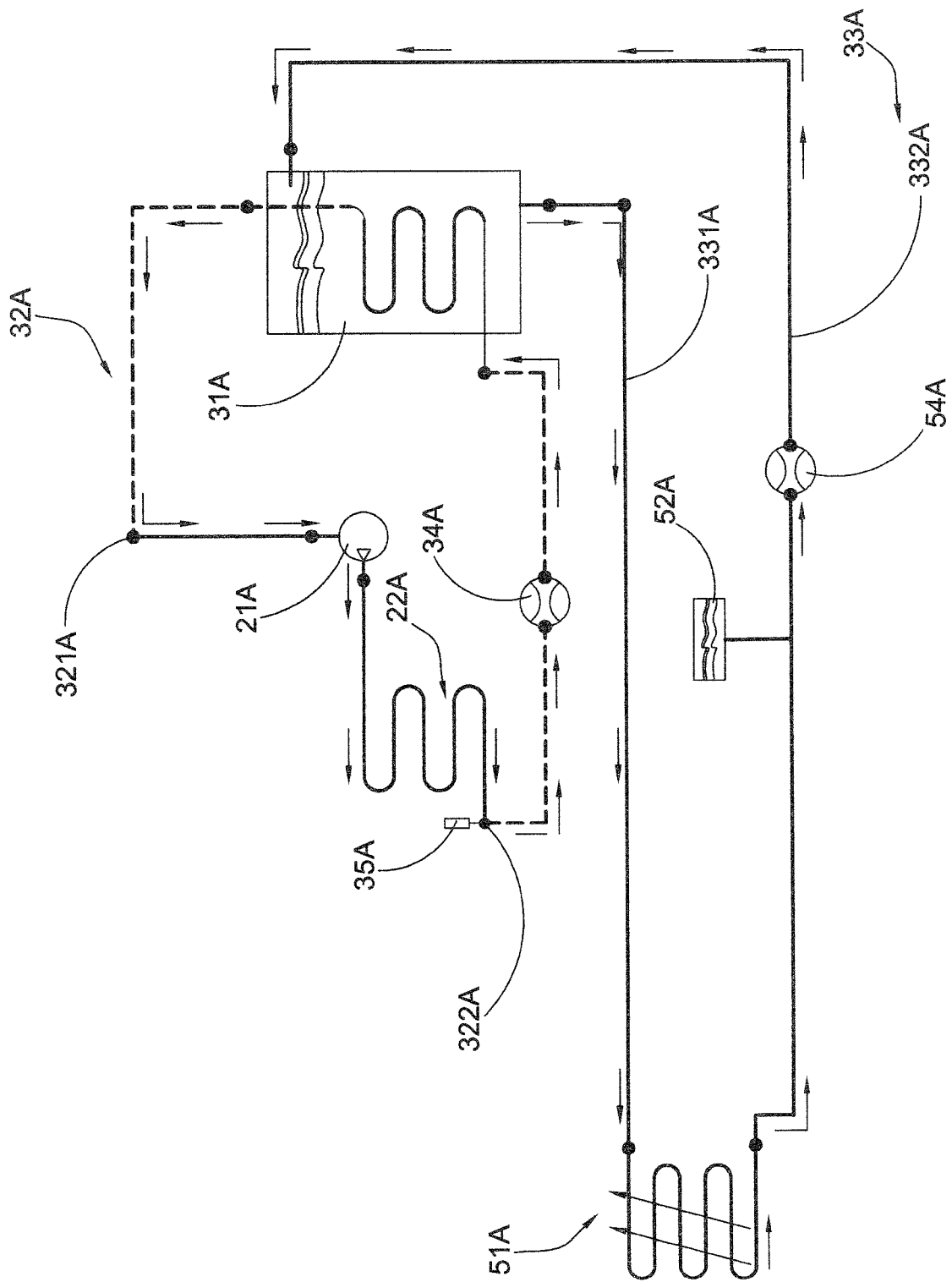
FIG. 11 is a flow diagram of the intake enhancement system incorporating the HVAC system according to the above third embodiment of the present invention.

As shown in FIGS. 9 and 11, an intake enhancement system of a third embodiment illustrates an alternative mode of the above first and second embodiments, wherein the intake enhancement system is arranged for incorporating with the vehicle which comprises a combustion engine 12A and an automotive HVAC (Heating, Ventilation, and Air-Conditioning) system 20A.

The intake enhancement system of the present invention is the cutting-edge Intercool technology which will revolutionize the combustion engine industry, by integrating HVAC system 20A, especially for air-conditioning, with intercool. The result is a cleaner burning, more efficient, fuel intake. The intake enhancement system of the present invention is available as a feature for new vehicles or as an aftermarket enhancement. Ideally and theoretically, the intake enhancement system of the present invention will be technology introduced into all consumer automobiles and power vehicles (water and air vehicles), as well as commercial vehicles, government vehicles and motorized equipment, in the next generation of Cold Induction technology.

As shown in FIGS. 9 and 11, the HVAC system 20A comprises a compressor 21A, a condenser 22A, and a heat exchanging line operatively connecting the compressor 21A and condenser 22A for guiding a flow of heat exchanging agent, such as refrigerant, between the compressor 21A and the condenser 22A for heat exchange. The heat exchanging line has a suction section that the heat exchanging agent flows to the compressor 21A, and a discharge section that the heat exchanging agent flow discharges from the compressor 21A. Accordingly, there are two types of HVAC system 20A in the industry, i.e. the accumulator (cycling clutch) and expansion valve type system.

Accordingly, the intake enhancement system is arranged for generating a cooled combustion environment for the internal combustion engine 12A by delivering the cooled combustion element to the internal combustion engine 12A for internal combustion. The combustion element can be air and/or fuel to be guided into the internal combustion engine 12A for internal combustion. The intake enhancement system comprises a chiller bath 31A operatively linked to the heat exchanging line of the HVAC system 20A via a delivery line 32A. The chiller bath 31A is preferably a glycol chiller bath to provide a heat-exchanging place for enabling the heat exchanging agent heat-exchanged with the cooling agent (or coolant) at the chiller bath 31A. The cooling agent is preferably antifreeze or glycol which is suitable for the internal combustion engine 12A. The cooling agent has a higher cooling power than the heat exchanging agent. In other words, the cooling agent is not the refrigerant or "Freon" because the refrigerant has shorter life span and weaker cooling power than glycol. The refrigerant is not suitable for the internal combustion engine 12A. The chiller bath 31A can be installed into the vehicle at the trunk or behind the front grill of the vehicle.

As shown in FIG. 9, the chiller bath 31A is a brazed flat plate type chiller bath which comprises a plurality of chiller plates overlapped with each other to define a plurality of heat exchanging agent compartments and a plurality of cooling agent compartments between every two of the chiller plates, wherein the heat exchanging agent compartments are alternating with the cooling agent compartments. The heat exchanging agent is guide to flow at the heat exchanging agent compartments and the cooling agent is guided to flow at the cooling agent compartments. Therefore, the cooling agent will heat-exchange with the heat exchanging agent at the chiller bath 31A.

Figure 10:
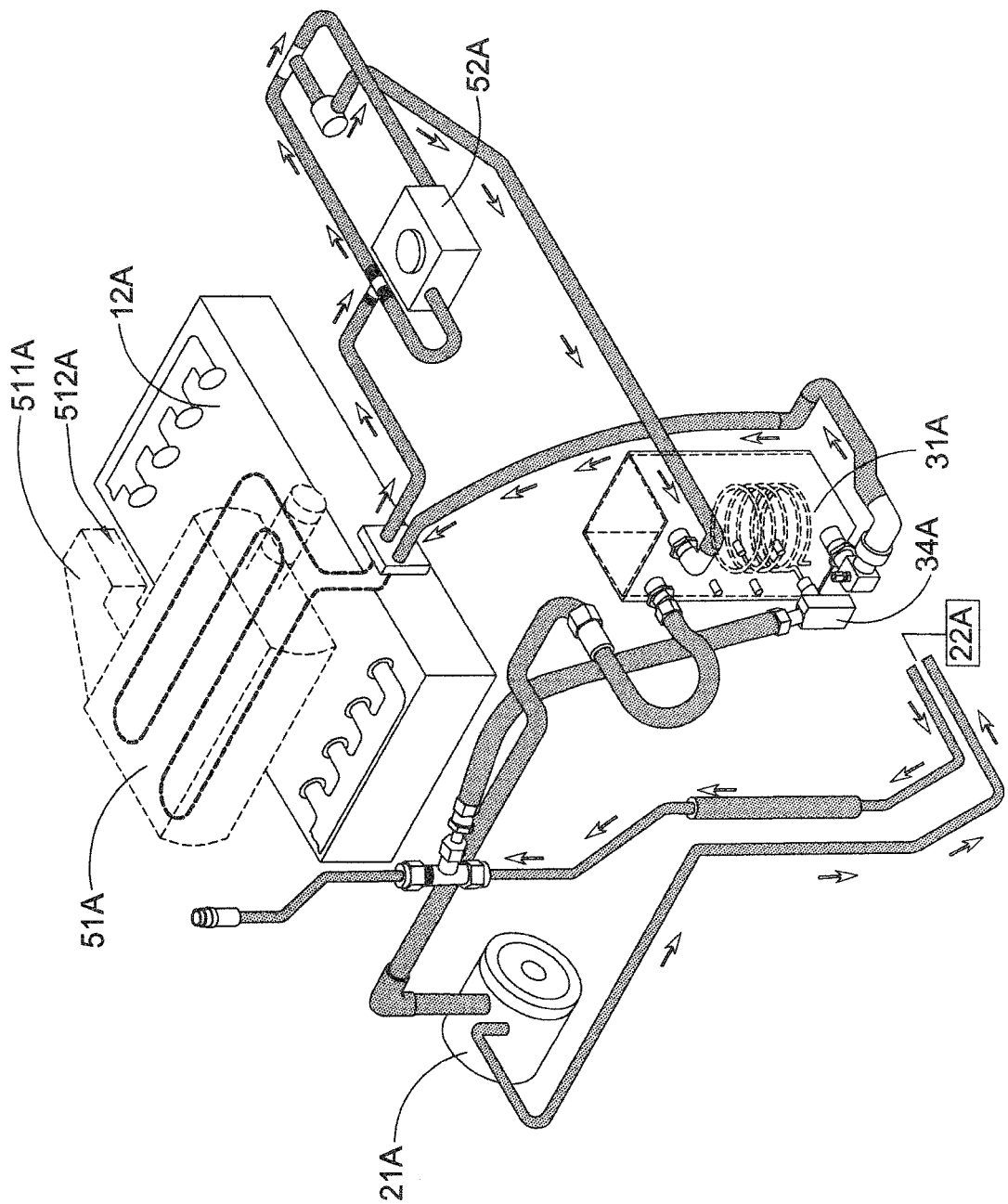
FIG. 10 illustrates an alternative mode of the chiller bath of the intake enhancement system according to the above third embodiment of the present invention.

Alternatively, the chiller bath 31A can be a chiller coil type chiller bath, as shown in FIG. 10. The chiller bath 31A comprises a chiller coil supported in a cooling agent compartment, wherein the heat exchanging agent is guided to flow at the chiller coil while the cooling agent is guided to fill in the cooling agent compartment in order to enable the cooling agent to be heat-exchanged with the heat exchanging agent at the chiller bath 31A.

Accordingly, the delivery line 32A has a discharge end 321A tapped at the suction section of the heat exchanging line and a suction end 322A tapped at the discharge section of the heat exchanging line. The heat exchanging agent is guided to flow both of the heat exchanging line and the delivery line 32A.

The intake enhancement system further comprises a cooling line 33A for guiding the cooling agent between the chiller bath 31A and the combustion engine 12A. It is worth mentioning that the cooling agent is only guided to flow toward the combustion engine 12A but not into the combustion engine 12A. The cooling line 33A has a cooling line discharge section 331A for discharging the cooling agent from the chiller bath 31A toward the combustion engine 12A and a cooling line suction section 332A for guiding the cooling agent back to the chiller bath 31A from the combustion engine 12A.

Accordingly, both the delivery line 32A and the cooling line 33A are two cycling lines that the heat exchanging agent and the cooling agent are guided to different particular areas in a cycling manner through the delivery line 32A and the cooling line 33A. It is worth mentioning that the cooling line 33A is arranged to deliver the cooling agent toward the combustion engine 12A in order to cool down the combustion element right before the fuel enters into the combustion engine 12A.

According to the preferred embodiment, the intake enhancement system further comprises a metering device 34A and a high pressure cut out switch 35A operatively provided at the delivery line 32A. In particular, the metering device 34A is a low pressure metering device provided at the delivery line 32A between the suction end 322A thereof and the chiller bath 31A. The high pressure cut out switch 35A is provided at the suction end 322A of the delivery line 32A which is a junction of the discharge section of the heat exchanging line.

The intake enhancement system further comprises a cooling agent reservoir 52A and a pump 54A sequently provided at the cooling line suction section 332A of the cooling line 33A, wherein the cooling agent will pass through the cooling agent reservoir 52A and the pump 54A in a sequent order and will return back to the chiller bath 31A. In particular, the cooling agent reservoir 52A is provided at the cooling line suction section 332A of the cooling line 33A via a three-way valve. Accordingly, the cooling agent reservoir 52A can be an expansion tank for storing and refilling the cooling agent.

According to the third embodiment, the cooling agent is arranged for cooling air as the combustion element before entering into the combustion engine 12A. In the third embodiment, the cooling line 33A is extended from the chiller bath 31A for operatively linking to an air intake of the vehicle in order to cool air as the combustion element before entering into the combustion engine 12A.

Accordingly, turbocharger and Intercooler technology have drastically improved in recent years. A "turbo" compressor is powered by a gas turbine driven by the engine's own exhaust gases whereas a "supercharger" compressor is directly driven by either a belt system or gear system right from the engine. Both of these systems increase the air induction temperature. Compressing air creates heat, this occurs in any gas when it is pressurized. An increase in boost proportionately increases heat. If the heat that forced induction generates is not addressed correctly the results will be offset negatively, with possible catastrophic engine damage.

An "intercooler" is a heat exchanger used when ambient air flows across the intercooler the hot air generated by the compressor is cooled. It is commonly installed in front of the engine's radiator and operates much in the same way as a radiator. The "air cooled" heat exchanger is only as efficient as the ambient climate and the air flow provided. Efficiency is reduced in cases of stationary, traffic, hot climate and/or during combined operation.

Currently, many types of cold charge induction systems exist. Cold Charge Induction is the process of cooling the air to boost and maximize efficiency. Most Cold Charge Induction Systems use common, but nonconventional, methods such as: ice, methanol, liquid nitrogen and nitrous oxide.

Each are generally intended for sport driving as they can only offer temporary benefits and not intended for the average consumers.

The intake enhancement system of the present invention promotes a mixture of dense air and fuel intake to the combustion engine 12A. This characteristic promotes more combustion per engine cycle. Optimum ignition timing and combustion in turn increases the output of the combustion engine 12A, while reducing greenhouse emissions and increasing fuel efficiency.

Air and fuel respond to temperature in the same way. Air that is heated is less dense than cold air. For example, when heat is introduced to air from a source, such as engine heat, the molecules are excited by this new source of energy. Heat increases the probability of molecule activity. Molecules begin moving faster, when they bump into one another they bounce further away. This increased space between the fast-moving molecules decreases the density—a process known as Conduction. Conduction causes a hot air balloon to rise. Conduction is great for floating a hot air balloon, but not necessarily for engine performance and efficiency.

In contrast, cold air is more dense. Without heat (energy) the air molecules to have nothing to fuel fast movement. Cold air molecules are therefore less active so that when they do bump into one another they don't ricochet off in opposite directions and far distances. The molecule activity is low; it's a nudging of one another and slowly pulling back. Therefore, the molecules are not broken or forced apart by their own momentum, allowing for coexistence together in a smaller space. When molecules are tightly packed together, the result is increased density/mass (weight). In terms of fuel combustion: more weight means greater mass to burn—greater mass to burn equals more energy.

When an internal combustion engine is cool it generates maximum efficiency in regard to emissions, fuel economy, torque and horsepower. The intake enhancement system of the present invention operates in a similar fashion to that of a conventional intercooler, but unlike a conventional intercooler, and the other Cold Induction Systems, The intake enhancement system of the present invention provides an unlimited supply of cooling to the engine's induction system to cool the engine's fuel and air intake temperature by integrating the air-conditioning system and technology already existing in most automobiles. That is:

Cool Air+Fuel=Higher Efficiency, Greater Performance and Lower Emissions

Accordingly, forced induction is generated by the turbo or supercharger. Both can be referred to as an "air compressor" for the purpose of forced induction to the internal combustion engine 12A to increase the mass of air entering the engine which will create an increased output to the engine. This mass of compressed air is commonly measured in "PSI" (pounds per square inch) also referred to as "BOOST". The intake enhancement system of the present invention offers a CONTROLLED, sustainable cold temperature, cooling fuel and increase the forced induction to both Turbo and Supercharger engines.

According to the preferred embodiment, the air is cooled at the intercooler 5113 of the air intake before entering into the combustion engine 12A. The intercooler 51A is operatively linked at the cooling line discharge section 331A of the cooling line 33A to guide the cooling agent from the chiller bath 31A to the intercooler 51A and at the suction end 332A of the cooling line 33A to guide the cooling agent back to the chiller bath 31A from the intercooler 51A. Accordingly, the intercooler 51A can be a super charger or turbo charger of the vehicle, wherein the intercooler 51A comprises a throttle body 511A which has an ambient air intake for the air entering into the throttle body 511A of the intercooler 51A.

In other words, after the heat exchanging agent is heat-exchanged with the cooling agent, the cooling agent is cooled at a predetermined temperature. Then, the cooling agent is guided to flow toward the intercooler 51A in order to heat-exchange with the air inside the intercooler 51A. Once the air is cooled by the cooling agent, the air is then guided into the combustion engine 12A for internal combustion. It is worth mentioning that after the air is cooled by the cooling agent at the intercooler 51A, the cooling agent is then flowed back to the chiller bath 31A to be repeatedly cooled by the heat exchanging agent in a cycling manner.

Figure 12:
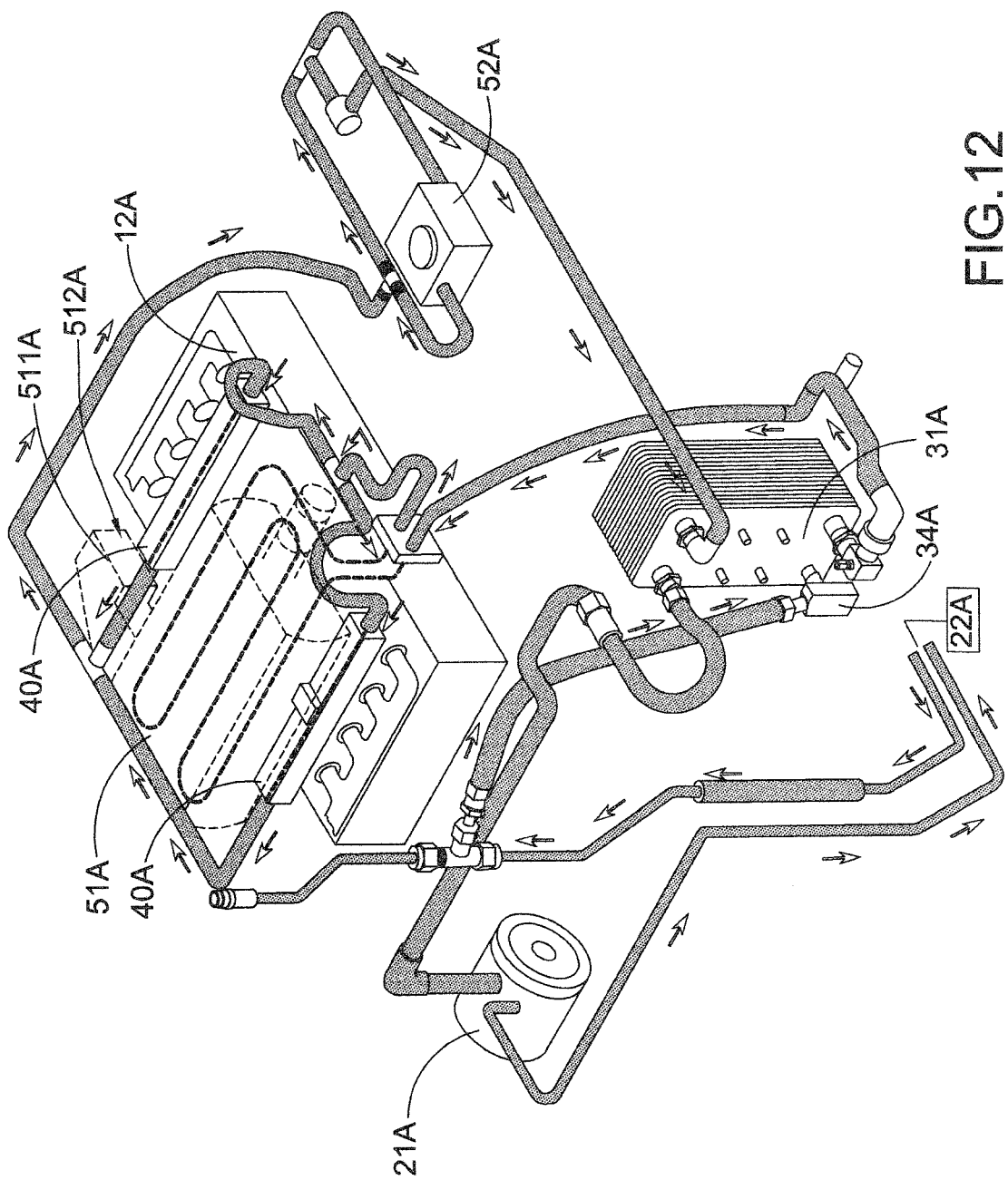
FIG. 12 shows a first modification of the intake enhancement system incorporating the HVAC system according to the above third embodiment of the present invention, illustrating the fuel rail with the fuel line.
Figure 13:
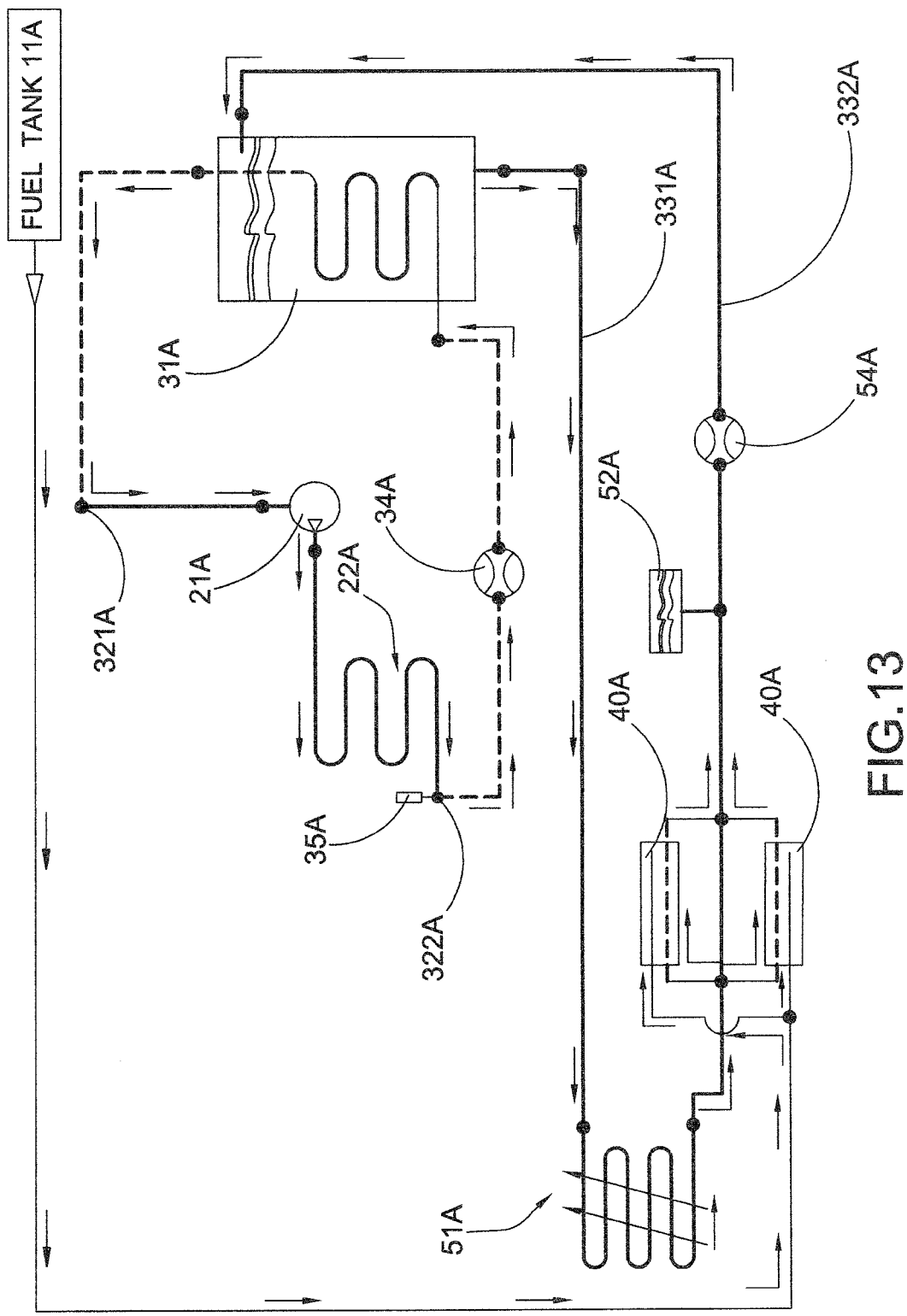
FIG. 13 is a flow diagram of the first modification of the intake enhancement system incorporating the HVAC system according to the above third embodiment of the present invention.

FIGS. 12 and 13 are the first modification of the third embodiment, wherein the cooling agent is arranged to cool the fuel as the combustion element before the fuel enters into the combustion engine 12A. Accordingly, the fuel line is operatively linked to the fuel tank 11A with the combustion engine 12A for delivering fuel from fuel tank 11A to the combustion engine 12A.

As shown in FIGS. 12 and 13, the intake enhancement system further comprises at least a fuel rail 40A provided at the cooling line 33A for enabling the cooling agent heat-exchanging with the fuel before the fuel enters into the combustion engine 12A.

Figure 24:
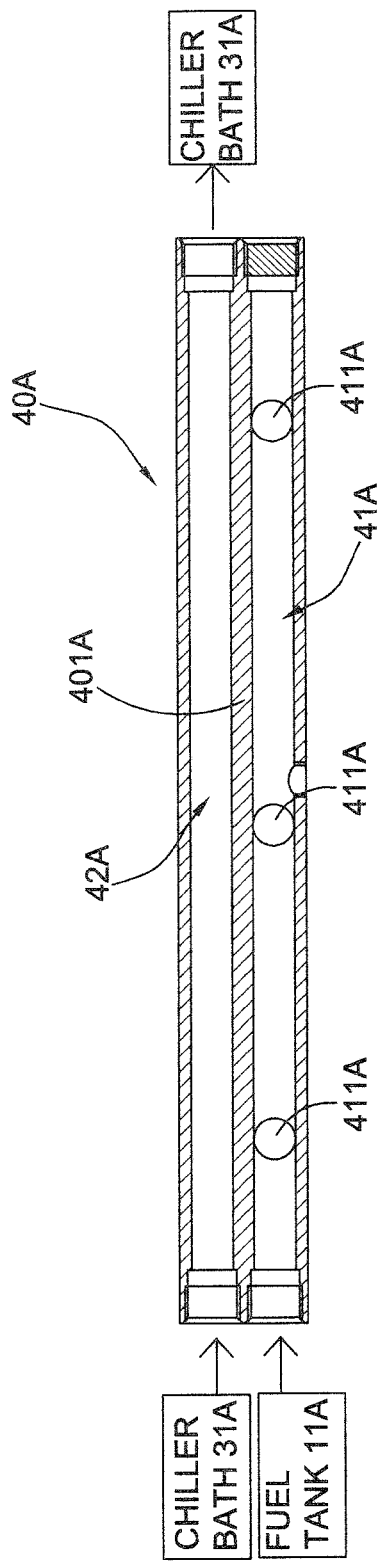
FIG. 24 is a top sectional view of the fuel rail of the intake enhancement system according to the above third embodiment of the present invention.
Figure 25:
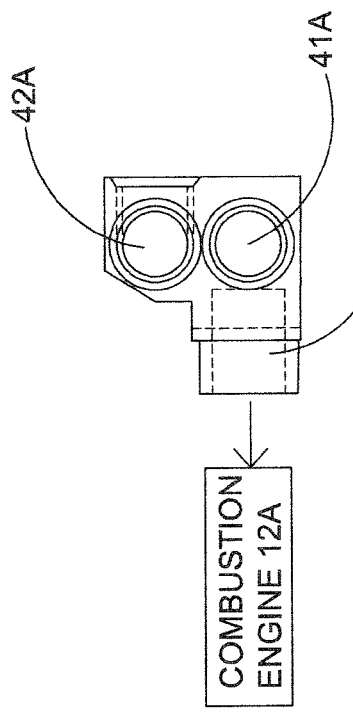
FIG. 25 is a side sectional view of the fuel rail of the intake enhancement system according to the above third embodiment of the present invention.

As shown in FIGS. 24 and 25, the fuel rail 40A has a fuel-engine channel 41A operatively link to the fuel line to guide the fuel to flow from the fuel line into the combustion engine 12A, and a cooling agent channel 42A operatively linked to the cooling line 33A to guide the cooling agent to flow through the cooling agent channel 42A. The fuel-engine channel 41A and the cooling agent channel 42A are two individual channels and are orientated side-by-side, such that when the fuel and the cooling agent pass through the fuel-engine channel 41A and the cooling agent channel 42A respectively, the fuel will be heat-exchanged (cooled down) by the cooling agent. It is worth mentioning that a partition wall 401A between the fuel-engine channel 41A and the cooling agent channel 42A are made of thermal conductive material for heat-exchanging between the fuel and the cooling agent.

The fuel-engine channel 41A has a plurality of fuel-engine outlets 411A communicatively link to the combustion engine 12A to discharge the fuel from the fuel-engine channel 41A to the combustion engine 12A. For example, when the combustion engine 12A is an inline four-cylinder combustion engine, four fuel-engine outlets 411A will be provided. When the combustion engine 12A is a V-6 cylinder combustion engine, two fuel rails 40A will be used, wherein each of the fuel rails 40A will have three fuel-engine outlets 411A.

The cooling agent channel 42A has an inlet for guiding the cooling agent from the chiller bath 31A to the fuel rail 40A, and an outlet for guiding the cooling agent back to the chiller bath 31B from the fuel rail 40A.

Preferably, the cooling agent is arranged to cool the air and fuel before the air and fuel are guided to enter into the combustion engine 12A. As shown in FIG. 13, the cooling agent is guided to flow to the intercooler 51A before the cooling agent is guided to flow to the fuel rail 41A. In other words, the air will be cooled first before the fuel is cooled. Accordingly, after the cooling agent is guided to flow to the intercooler 51A, the cooling agent is guided to flow to the fuel rail 40A.

Figure 14:
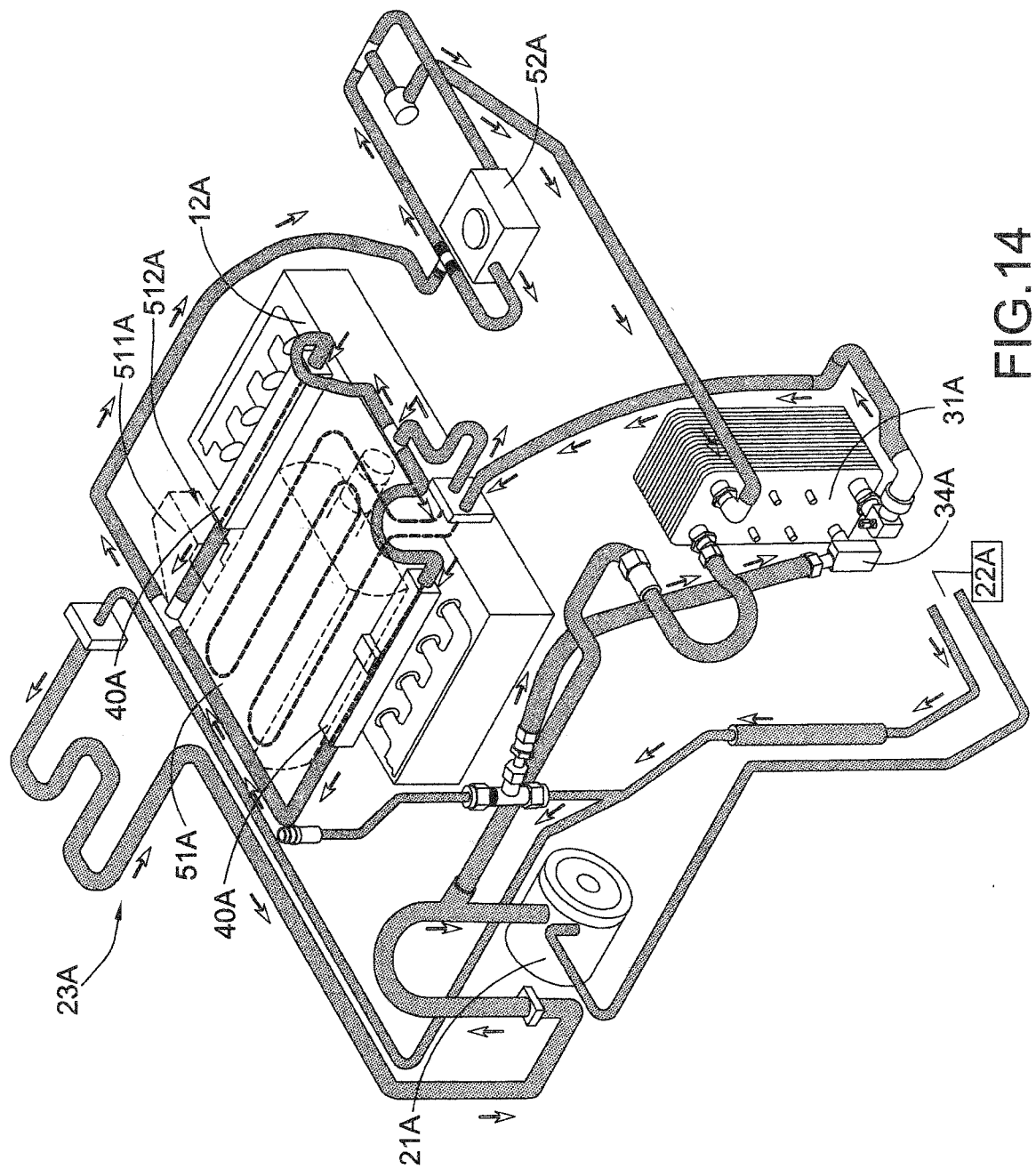
FIG. 14 shows a second modification of the intake enhancement system incorporating the HVAC system according to the above third embodiment of the present invention, illustrating the intake enhancement system with cabin air condition integration flow.
Figure 15:
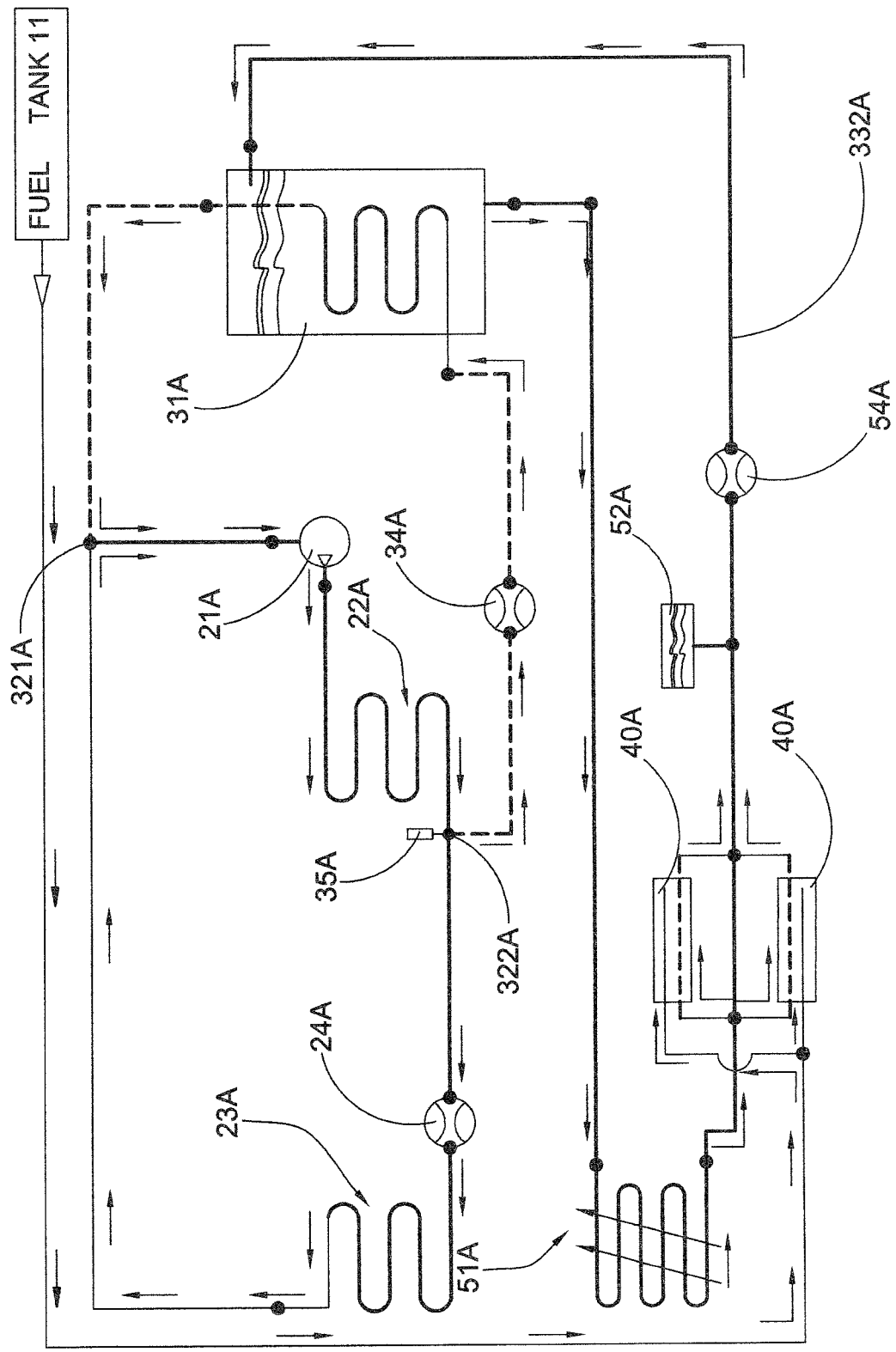
FIG. 15 is a flow diagram of the second modification of the intake enhancement system incorporating the HVAC system according to the above third embodiment of the present invention.

FIGS. 14 and 15 show the cabin air condition integration flow of the automotive HVAC system 20A, wherein the evaporator 23A of the HVAC system 20A is operatively linked between the compressor 21A and the condenser 22A, wherein the heat exchanging line is operatively connecting the compressor 21A, condenser 22A, and evaporator 23A for guiding the flow of heat exchanging agent among the compressor 21A, the condenser 22A, and the evaporator 23A for heat exchange. A low pressure metering device 24A is operatively provided at the heat exchanging line between the condenser 22A and the evaporator 23A. Accordingly, the condenser 22A is a high pressure heat exchanger at grill while the evaporator 23A is a low pressure heat exchanger at dashboard.

FIGS. 16 to 19 illustrate a further modification of the intake enhancement system, wherein the intake enhancement system 30A further comprises a three-way actuator valve 60A incorporating with a "liquid to air" heat exchanger 55A. Accordingly, the "liquid to air" heat exchanger 55A is provided to operatively link with the cooling line 33A, wherein a suction end 551A is tapped at the cooling line suction section 332A of the cooling line 33A to operatively link to the "liquid to air" heat exchanger 55A while a discharge end 552A is tapped at the cooling line discharge section 331A of the cooling line 33A to operatively link to the "liquid to air" heat exchanger 55A. In particular, the suction end 551A is tapped at the cooling line suction section 332A of the cooling line 33A between the pump 54A and the chiller bath 31A. The discharge end 552A is tapped at the cooling line discharge section 331A of the cooling line 33A between the chiller bath 31A and the intercooler 51A. The "liquid to air" heat exchanger is a heat exchanger at grill.

The three-way actuator valve 60A is operatively linked between the cooling line 33A and the "liquid to air" heat exchanger 55A to selectively guide the flow direction of the cooling agent. Accordingly, the three-way actuator valve 60A is operatively linked at the suction end 551A, wherein the three-way actuator valve 60A has one inlet and two outlets. The inlet of the three-way actuator valve 60A is operatively coupled at the cooling line suction section 332A of the cooling line 33A to guide the cooling agent to flow from the pump 54A to the three-way actuator valve 60A. One of the outlets of the three-way actuator valve 60A is operatively coupled at the cooling line suction section 332A of the cooling line 33A to guide the cooling agent to flow from the three-way actuator valve 60A to the chiller bath 31A. Another outlet of the three-way actuator valve 60A is operatively coupled at the suction end 551A to guide the cooling agent to flow from the three-way actuator valve 60A to the "liquid to air" heat exchanger 55A, such that the cooling agent will be returned back to the chiller bath 31A via the discharge end 552A of the "liquid to air" heat exchanger 55A.

Figure 17:
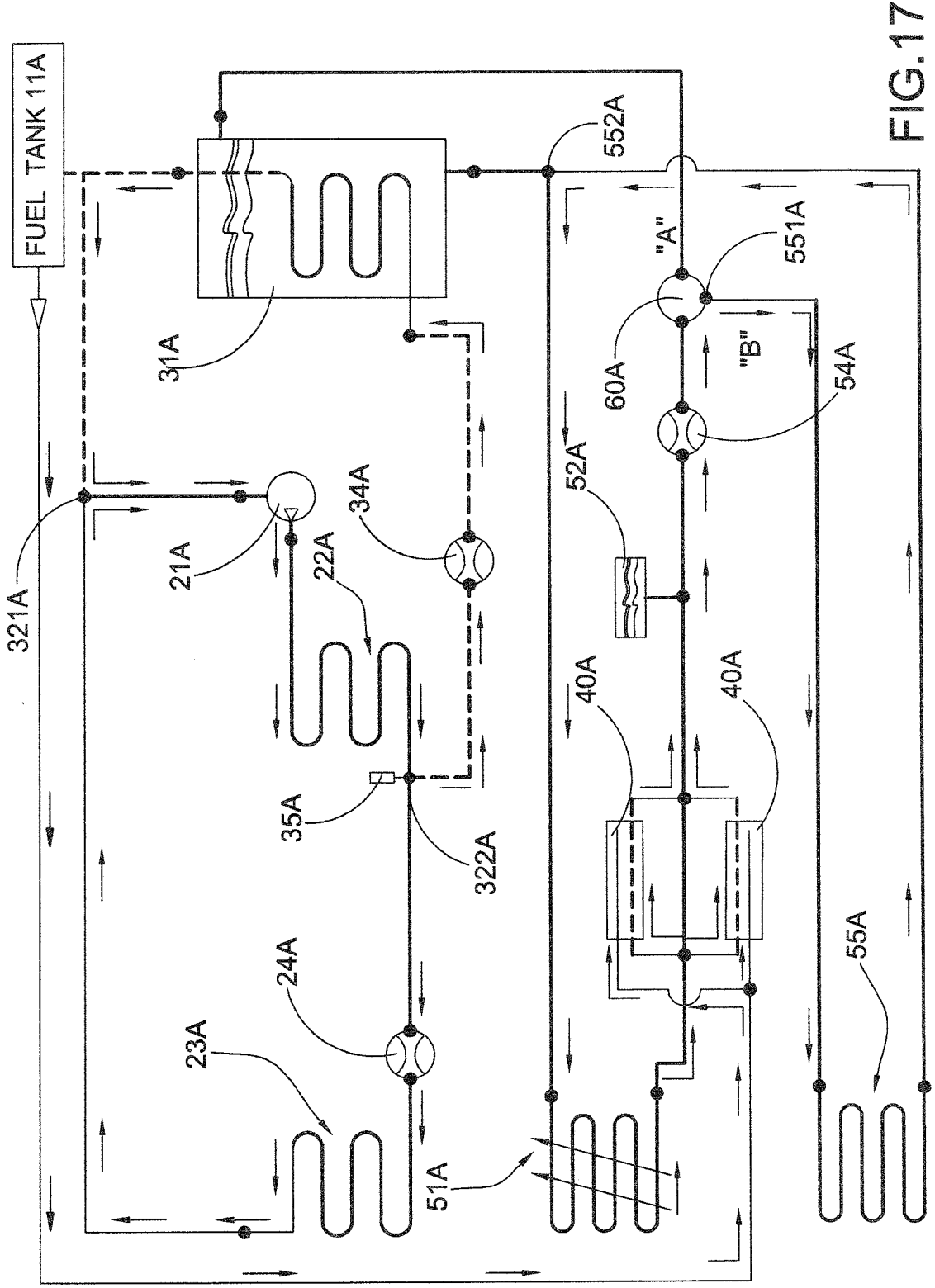
FIG. 17 is a flow diagram of the third modification of the intake enhancement system incorporating the HVAC system according to the above third embodiment of the present invention, illustrating the flow direction of cooling agent at the heat exchanger path.
Figure 22:
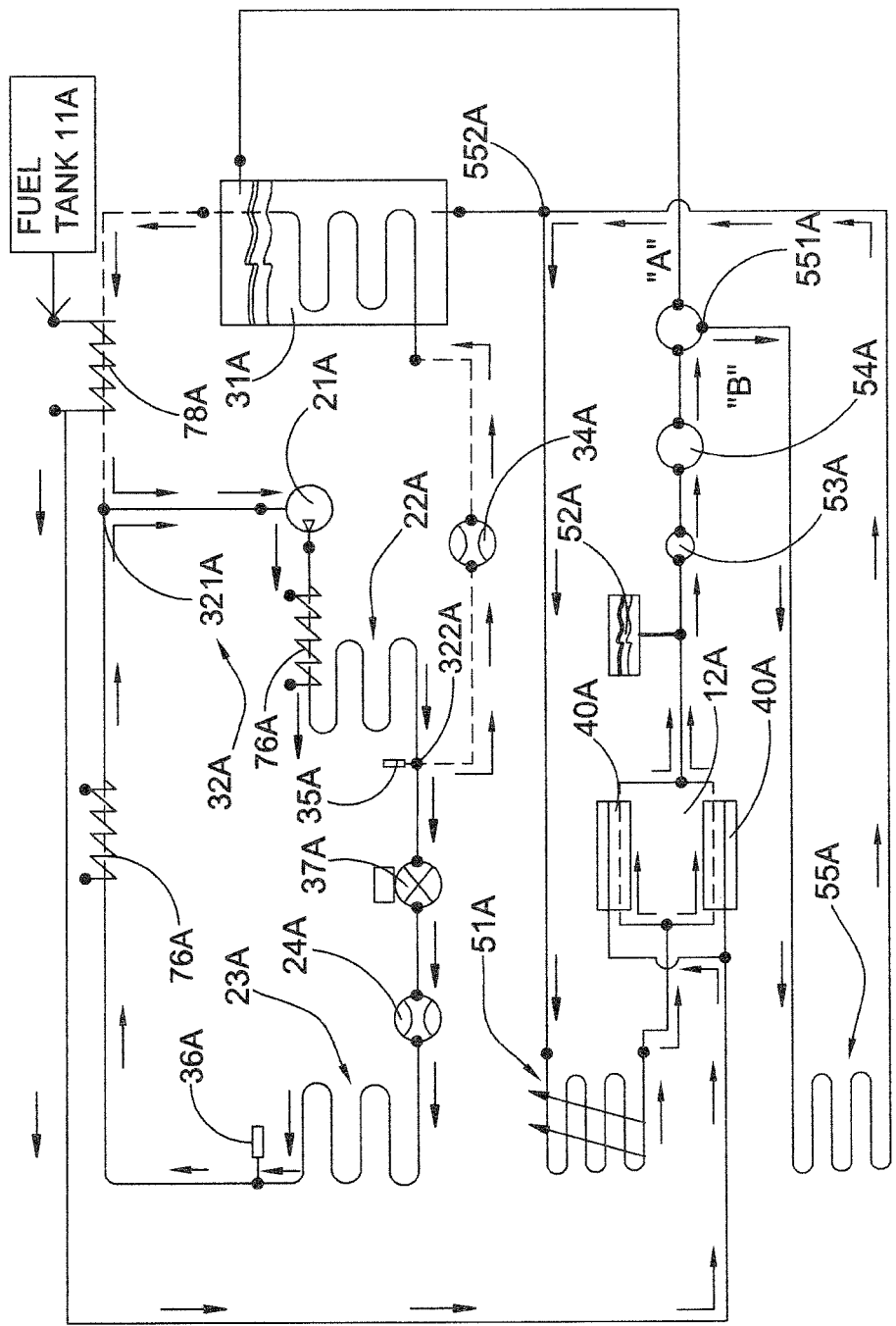
FIG. 22 is flow diagram of the completed modification of the intake enhancement system according to the above third embodiment of the present invention, illustrating a "Cabin only" cooling mode.

In other words, the three-way actuator valve 60A is arranged to selectively control the flow of the cooling agent between two paths deepening on the operational status of the HVAC system 20A. The first path, i.e. the position A in FIG. 17, is a heat exchanger path that the cooling agent is guide to pass through the "liquid to air" heat exchanger 55A. The second path, i.e. the position B in FIG. 22, is a bypass path that the cooling agent is guided to directly flow back to the chiller bath 31A without passing through the "liquid to air" heat exchanger 55A.

Figure 16:
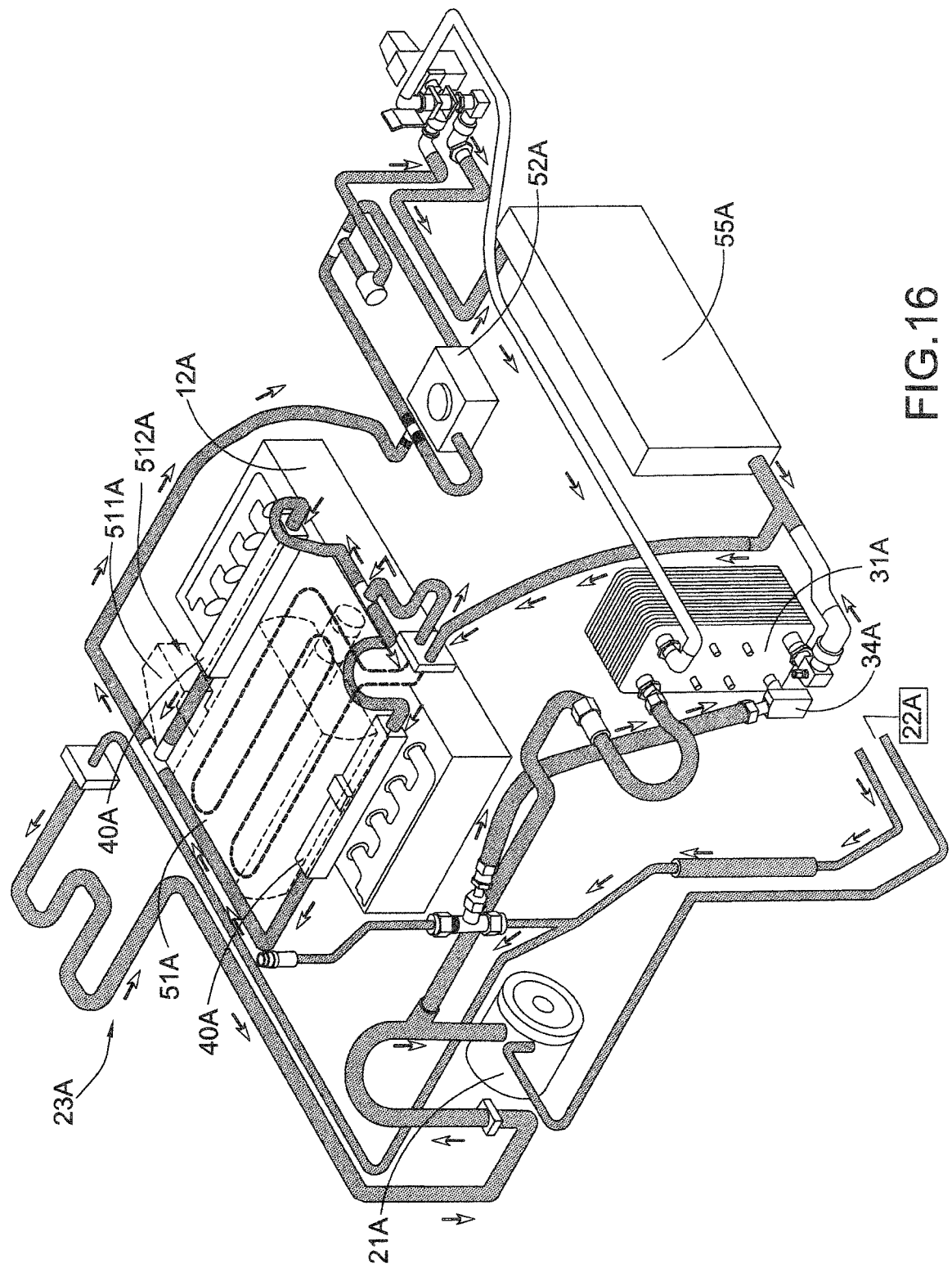
FIG. 16 shows a third modification of the intake enhancement system incorporating the HVAC system according to the above third embodiment of the present invention, illustrating the three-way actuator valve to guide the cooling agent at the heat exchanger path.

The three-way actuator valve 60B is actuated in different conditions. As shown in FIGS. 16 and 17, when the HVAC system 20A (especially for the AC system) of the vehicle is turned off, the three-way actuator valve 60A is actuated to only allow the cooling agent to flow at the heat exchanger path, such that the cooling agent is guide to pass through the "liquid to air" heat exchanger 55A. After the cooling agent passes through the "liquid to air" heat exchanger 55A, the cooling agent is guided to flow back to the intercooler 51A.

Figure 18:
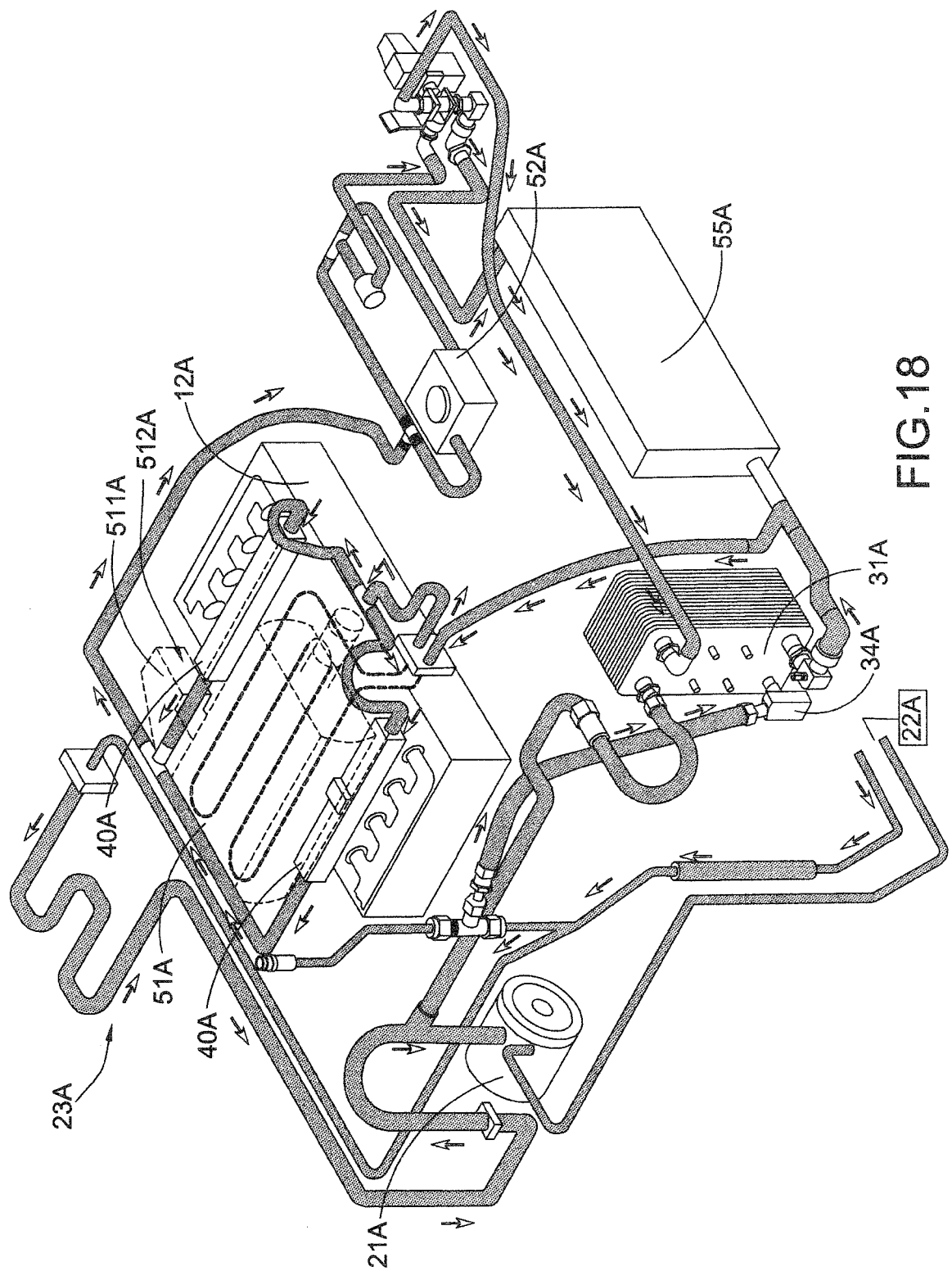
FIG. 18 shows a third modification of the intake enhancement system incorporating the HVAC system according to the above third embodiment of the present invention, illustrating the three-way actuator valve to guide the cooling agent at the bypass path.
Figure 19:
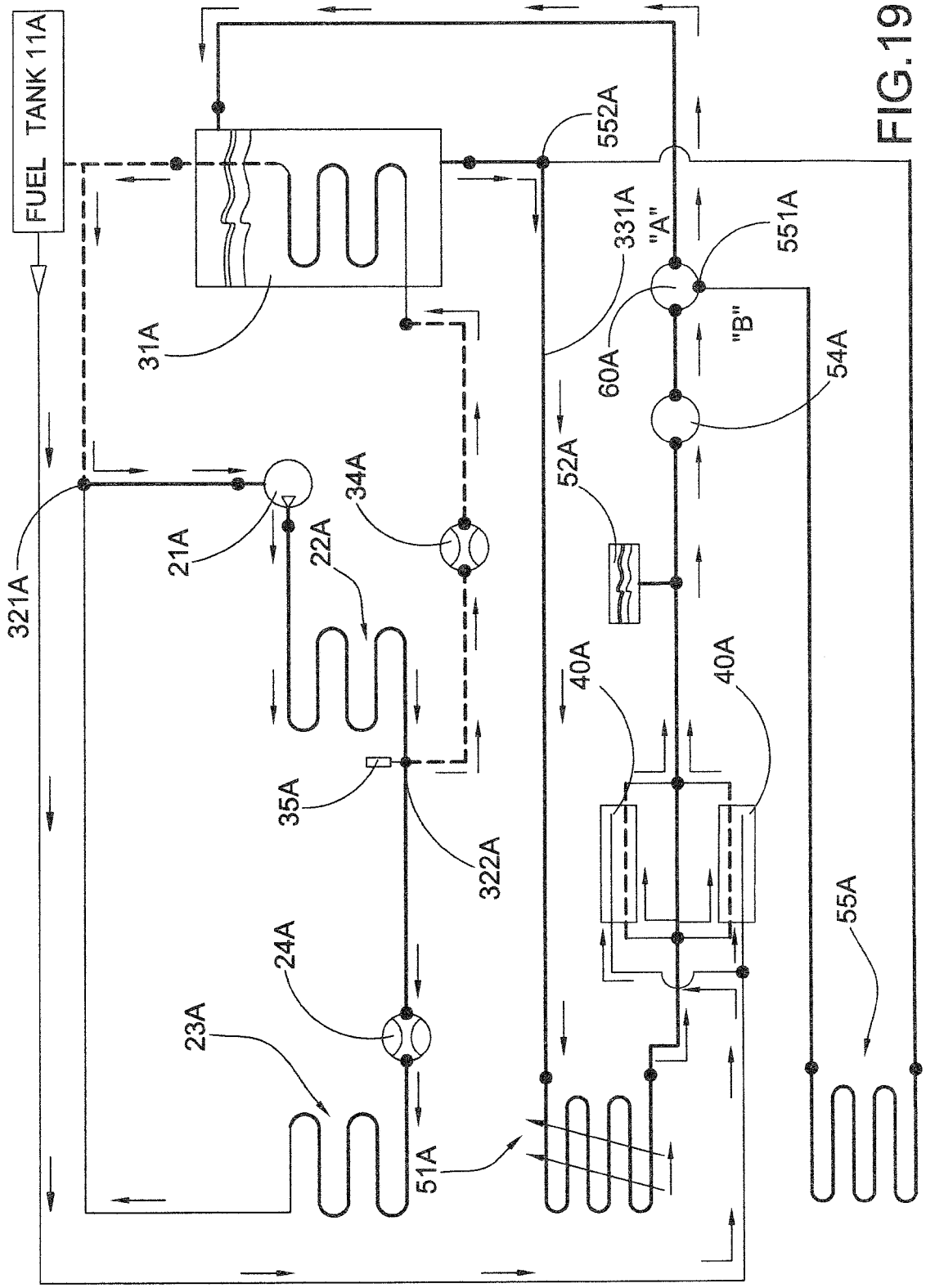
FIG. 19 is a flow diagram of the third modification of the intake enhancement system incorporating the HVAC system according to the above third embodiment of the present invention, illustrating the flow direction of cooling agent at the bypass path.
Figure 20:
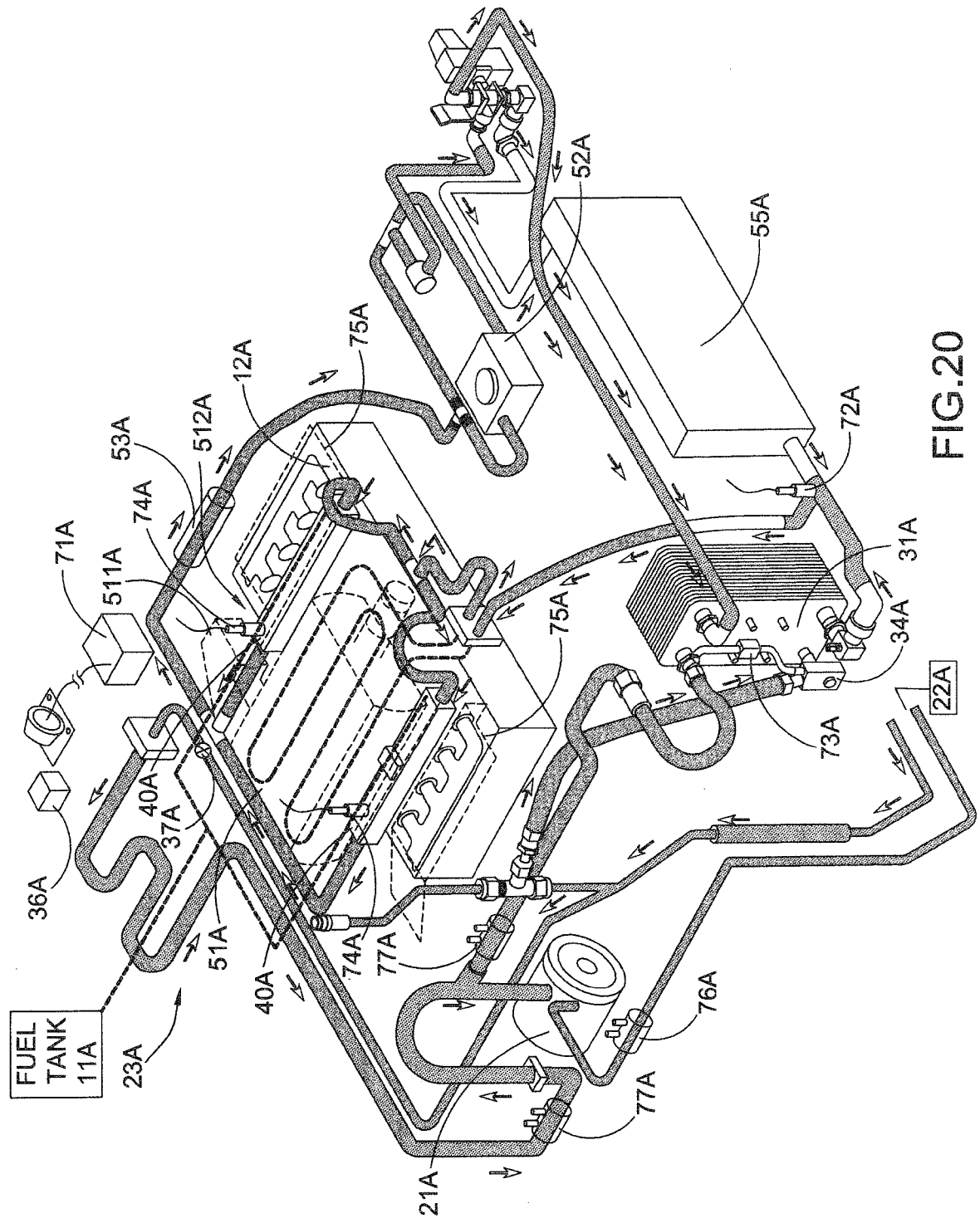
FIG. 20 shows the completed modification of the intake enhancement system incorporating the HVAC system according to the above third embodiment of the present invention.

As shown in FIGS. 18 and 19, when the HVAC system 20A (especially for the AC system) of the vehicle is turned on, the three-way actuator valve 60A is actuated to only allow the cooling agent to flow at the bypass path, such that the cooling agent is guide to directly return back to the chiller bath 31A without passing through the "liquid to air" heat exchanger 55A. Accordingly, a control of the three-way actuator valve 60A can be provided at the dashboard of the vehicle, such that the driver is able to actuate the three-way actuator valve 60A according to the on-off condition of the HVAC system 20A (especially for the AC system). It should be appreciated that the control of the three-way actuator valve 60A can be an automatic/electronic control linked to the HVAC system 20A (especially for the AC system), such that when the HVAC system 20 (especially for the AC system) is turned on/off, the three-way actuator valve 60A will be automatically switched at the corresponding condition.

It is worth mentioning that when the cooling agent is guided to pass through the "liquid to air" heat exchanger 55A, the "liquid to air" heat exchanger 55A will provide adequate cooling effect to the cooling agent to cool the cooling agent before passing to the intercooler 51A. Furthermore, in case any one component of the AC system is fail to operate, the intake enhancement system of the present invention will control and override the three-way actuator valve 60A to divert the cooling agent to the "liquid to air" heat exchanger 55A in order to cool the cooling agent by the "liquid to air" heat exchanger 55A.

FIGS. 20 to 23 illustrate a best mode of the present invention, wherein the intake enhancement system further comprises a cabin cycling thermostatic switch 36A and a cabin cycling solenoid valve 37A.

The cabin cycling thermostatic switch 36A is provided at the suction section of the heat exchanging line between the evaporator 23A and the compressor 21A. The cabin cycling thermostatic switch 36A is a cabin evaporator thermostat (thermal coupler) maintains proper cabin evaporator temperature integrated to the controller of the intake enhancement system 30A. The cabin cycling thermostatic switch 36B governs the cabin cycling solenoid valve 37A (for HVAC system 20A with accumulator).

The cabin cycling solenoid valve 37A is provided at the suction section of the heat exchanging line between the condenser 22A and the evaporator 23A. The cabin cycling solenoid valve 37A is operatively linked to the high pressure cut out switch 35A. The cabin cycling solenoid valve 37A maintains proper cabin evaporator temperature by cycling open and closed of the cabin cycling solenoid valve 37A which is governed by the cabin cycling thermostatic switch 36A. The cabin cycling solenoid valve 37A is closed in the "intercooler only" mode. The intake enhancement system 30A then dedicates only to the intercooler for increased efficiency that no cabin cooling is provided.

Figure 21:
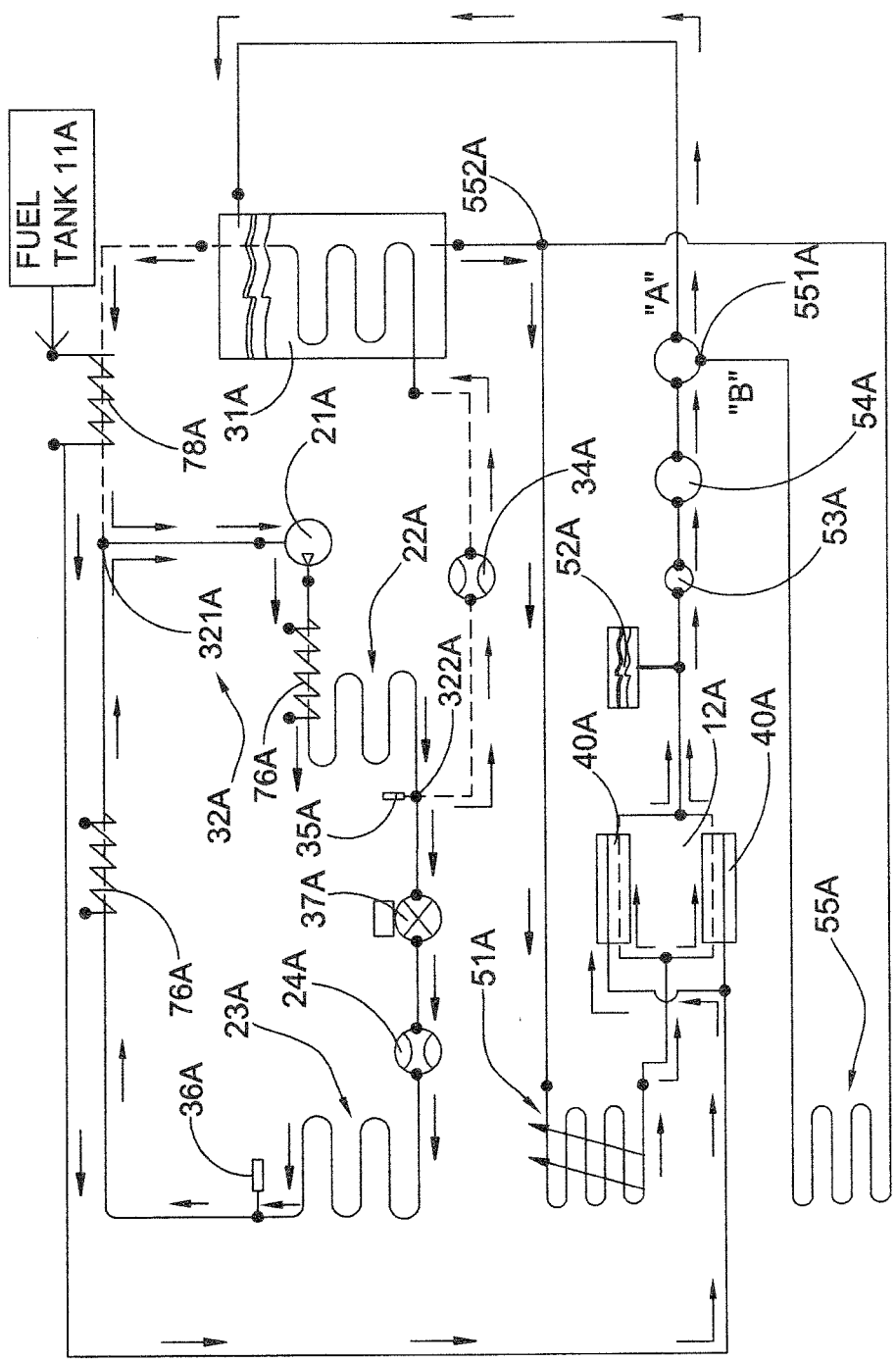
FIG. 21 is flow diagram of the completed modification of the intake enhancement system according to the above third embodiment of the present invention, illustrating a "Cabin/Intercooler" cooling mode.
Figure 23:
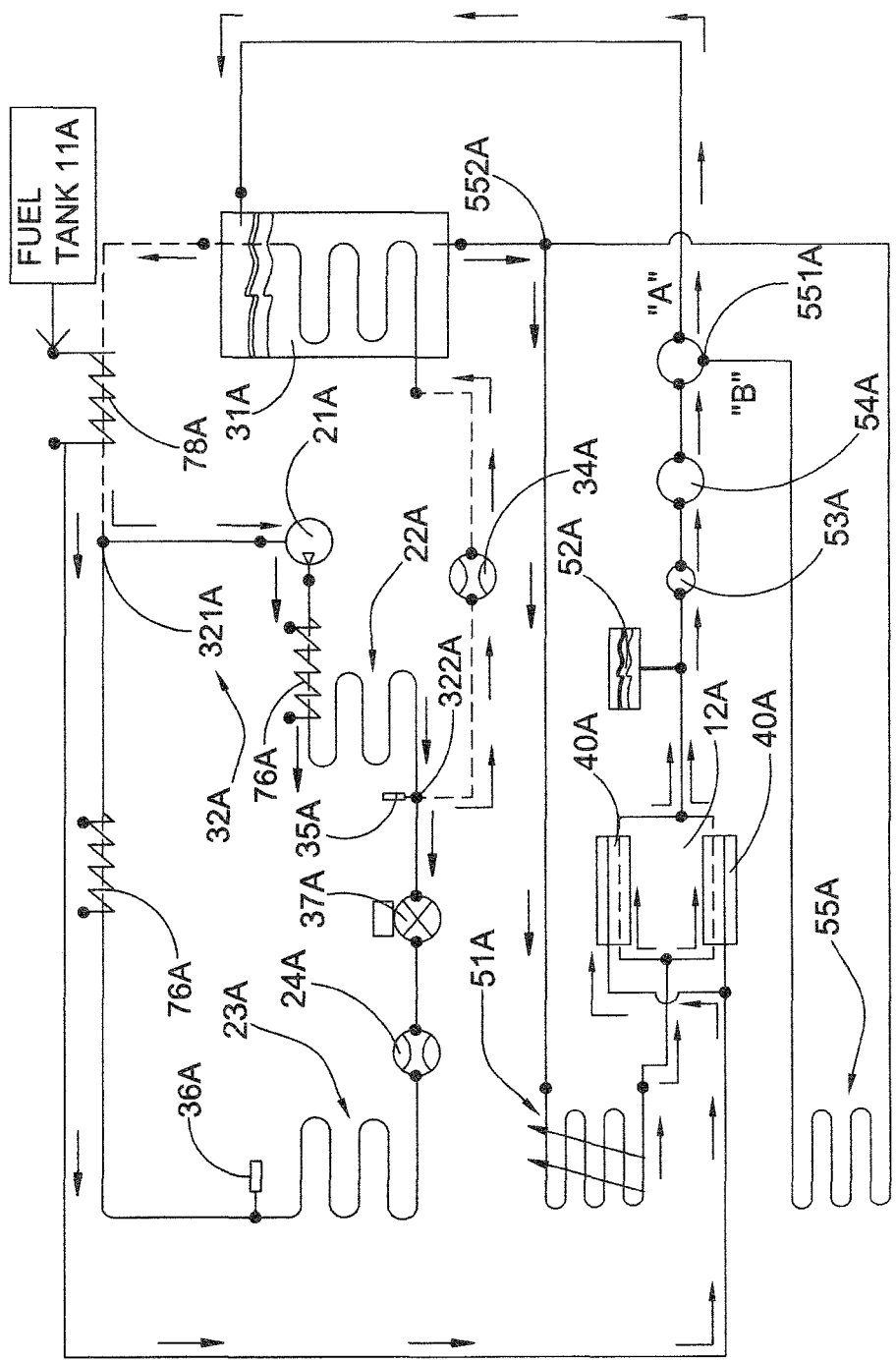
FIG. 23 is flow diagram of the completed modification of the intake enhancement system according to the above third embodiment of the present invention, illustrating an "Intercooler only" cooling mode.

It is worth mentioning that the flow of the heat exchanging agent is regulated among a "Cabin only" cooling mode, an "Intercooler only" cooling mode, and a "Cabin/Intercooler" cooling mode, as shown in FIGS. 21 to 23.

As shown in FIG. 21, at the "Cabin/Intercooler" cooling mode, the cabin cycling solenoid valve 37A is energized to be opened such that the heat exchanging agent is regulated to flow from the condenser 22A to the evaporator 23A. Therefore, the heat exchanging agent at the suction section of the heat exchanging line will merge with the heat exchanging agent at the delivery line 32A at the discharge end 321A thereof before flowing to the compressor 21A. In other words, the high pressure cut out switch 35A is actuated to split the heat exchanging agent into two different directions that the heat exchanging agent is guide to flow to the evaporator 23A and to flow back to the chiller bath 31A through the metering device 34A.

In addition, at the "Cabin/Intercooler" cooling mode, the three-way actuator valve 60A is actuated to only allow the cooling agent to flow at the bypass path, such that the cooling agent is guide to directly return back to the chiller bath 31A without passing through the "liquid to air" heat exchanger 55A.

As shown in FIG. 22, at the "Cabin only" cooling mode, the cabin cycling solenoid valve 37A is energized to be opened such that the heat exchanging agent is regulated to flow from the condenser 22A to the evaporator 23A. Therefore, the heat exchanging agent at the suction section of the heat exchanging line will merge with the heat exchanging agent at the delivery line 32A at the discharge end 321A thereof before flowing to the compressor 21A. In other words, in response to the cabin cycling solenoid valve 37A at the opened state and the closed state, the high pressure cut out switch 35A is actuated to split the heat exchanging agent into two different directions that the heat exchanging agent is guide to flow to the evaporator 23A and to flow back to the chiller bath 31A through the metering device 34A.

In addition, at the "Cabin only" cooling mode, the three-way actuator valve 60A is actuated to allow the cooling agent to flow at the heat exchanger path, such that the cooling agent is guide to directly return back to the chiller bath 31A through the "liquid to air" heat exchanger 55A.

As shown in FIG. 23, at the "Intercooler only" cooling mode, the cabin cycling solenoid valve 37A is de-energized to be closed such that the heat exchanging agent is stopped flowing from the condenser 22A to the evaporator 23A. Therefore, the heat exchanging agent will only guide to flow back to the chiller bath 31A through the metering device 34A. In other words, the high pressure cut out switch 35A is actuated not only to stop the heat exchanging agent to flow to the evaporator 23A but also to guide the heat exchanging agent to flow back to the chiller bath 31A through the metering device 34A.

In addition, at the "Intercooler only" cooling mode, the three-way actuator valve 60A is actuated to allow the cooling agent to flow at the bypass path, such that the cooling agent is guide to return back to the chiller bath 31A without passing through the "liquid to air" heat exchanger 55A.

The intake enhancement system further comprises a temperature controller or gauge 71B provided at the cooling line suction section 332A of the cooling line 33A between the fuel rail 40A and the cooling agent reservoir 52A. The temperature controller 71A displays the temperature of the cooling agent at the inlet ports of the intercooler 51A and the fuel rail 40A via a display, preferably a full color 4" touch screen display. The display also comes with a rear view camera input. The temperature controller 71A controls the cabin evaporator temperature (for HVAC system 20A with accumulator). The temperature controller 71A controls the three-way actuator valve 60A to selectively control the flow of the cooling agent between the heat exchanger at grill path and the bypass path. The temperature controller 71A controls the intake enhancement system 30A among the "Cabin only" cooling mode, the "Intercooler only" cooling mode, and the "Cabin/Intercooler" cooling mode. The temperature controller 71A also re-programs parameters in the vehicle's computer to enhance the performance of the intake enhancement system 30A to the vehicle by adding more horsepower and torque in minutes, pre-loading dyno proven tune files (10 custom tunes can be stored), high speed datalogging/monitoring, and reading/clearing DTC trouble codes. The display also displays and inputs the user adjustable vehicle parameters and user adjustable graphics.

The intake enhancement system further comprises a coolant temperature sensor 72A provided at a discharge end 552A to monitor the temperature of the cooling agent thereat. When the chiller bath 31A fails to operate or the temperature of the cooling agent exceeds 165° F., the coolant temperature sensor 72A will signal the temperature controller 71A to override the three-way actuator valve 60A to divert the cooling agent to the "liquid to air" heat exchanger 55A in order to provide adequate cooling effect for the cooling agent by the "liquid to air" heat exchanger 55A.

The intake enhancement system further comprises an oil migration bypass solenoid valve 73A operatively linked to the low pressure metering device 34A for preventing oil stagnation at the low pressure metering device 34A, for lowering the percentage of soluble oil entering the chiller bath 31A, and for allowing the heat exchanging agent to atomize more efficiently. Accordingly, the low pressure metering device 34B is coupled to the chiller bath 31A and is a fixed orifice manifold with oil migration bypass port coupled to the oil migration bypass solenoid valve 73A.

The intake enhancement system further comprises a fuel temperature sensor 74A for monitoring fuel temperature at the intake enhancement system 30A. Preferably, the fuel temperature sensor 74A is operatively coupled at the fuel rail 40A to monitor the fuel temperature before the fuel enters into the combustion engine 12A.

The intake enhancement system further comprises a filter assembly 53A provided at the cooling line suction section 332A of the cooling line 33A, wherein after the cooling agent discharges from the fuel rail 40A, the cooling agent will pass through the filter assembly 53A to the pump 54A in a sequent order and will return back to the chiller bath 31A. It is worth mentioning that the filter assembly 53B will maintain clean environment at the chiller bath 31A by filtering the cooling agent. Furthermore, the filter assembly 53A can be made of serviceable sight glass for allowing visual of the cooling agent flow, wherein LEDs can be incorporated at the filter assembly 53A for enhancing the visual of the cooling agent. The filter assembly 53A can be a particulate filter.

Accordingly, an exhaust manifold heat shield 75A is provided for reducing exhaust manifold heat to engine compartment. An optional heater 76A is provided at the discharge section of the heat exchanging line for operatively linking to an accessory heater/cooler, such as beverage cup holder. The optional heater 76A is provided at the discharge section of the heat exchanging line right after the compressor 21A. An optional cooler 77A is provided at the suction section of the heat exchanging line for operatively linking to the accessory heater/cooler, such as beverage cup holder. It is worth mentioning that the optional heater 76A and the optional cooler 77A can integrate to a 3-way valve to switch between hot and cold temperature at the beverage cup holder. An optional fuel pre-cooler 78A can be tapped at the fuel line to the delivery line 32A to pre-cool the fuel before entering to the fuel rail 40A.

By integrating the air-conditioning technology, the intake enhancement system of the present invention not only boosts performance, but eliminates efficiency lost to air cooling system. The entire size of the intake enhancement system for a passenger vehicle is approximately the size of a car battery and weighs approximately 45 lbs. Large semi-truck and bus systems are slightly larger and can mount just about anywhere on the vehicle. Other than routine scheduled air conditioning maintenance, the intake enhancement system does not require consumables or maintenance. Until now, with the exception of the intake enhancement system of the present invention, no known cold charge induction system exists that can regenerate and sustain its cooling properties.

Figure 26:
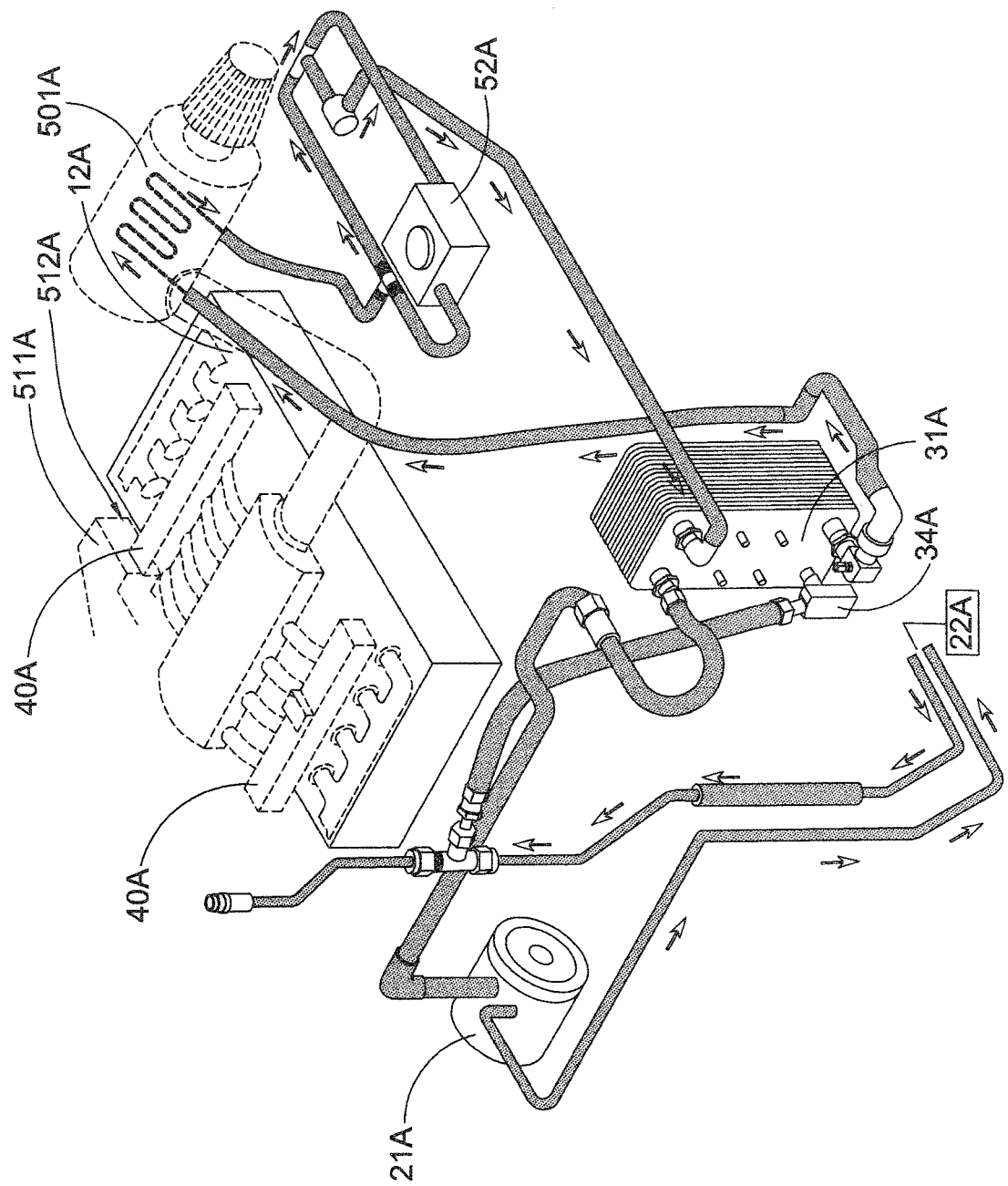
FIG. 26 shows the intake enhancement system for cooling air only according to the above third embodiment of the present invention.

As it is mentioned above, the intake enhancement system of the present invention is incorporated with the intercooler 51A to cool the air before the air enters into the combustion engine 12A. It is appreciated that the air from the air intake of a non-turbo vehicle can be cooled by the cooling agent. As shown in FIG. 26, the air intake comprises an air inlet filter 501A for sucking ambient air into the combustion engine 12A. Accordingly, the air inlet filter 501A is operatively linked at the cooling line discharge section 331A of the cooling line 33A to guide the cooling agent from the chiller bath 31A to the air inlet filter 501A and at the suction end 332A of the cooling line 33A to guide the cooling agent back to the chiller bath 31A from the air inlet filter 501A. Therefore, when the air is sucked into the air inlet filter 501A, the air is cooled by the cooling agent before entering into the combustion engine 12A.

Figure 27:
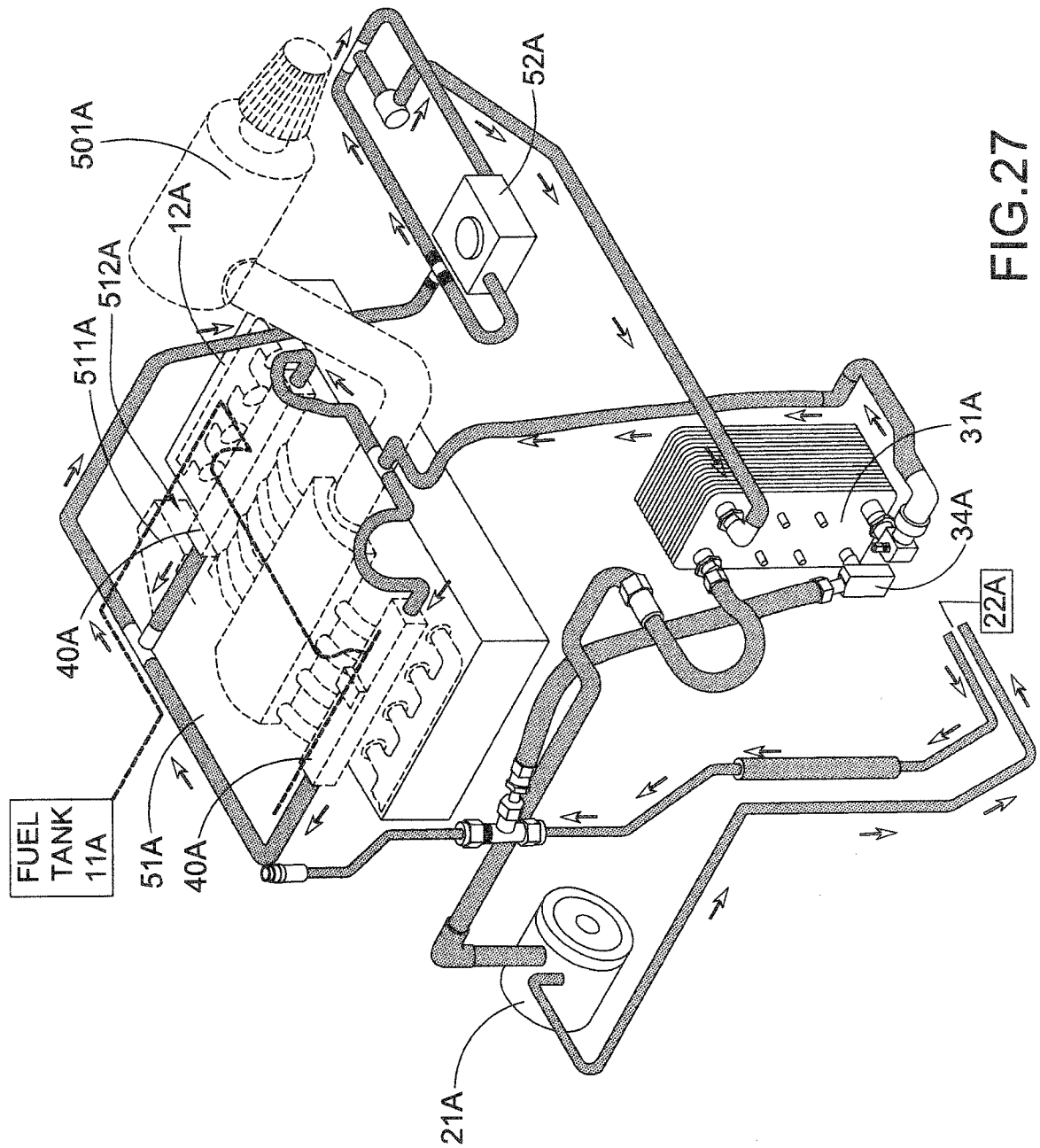
FIG. 27 shows the intake enhancement system for cooling fuel only according to the above third embodiment of the present invention.
Figure 28:
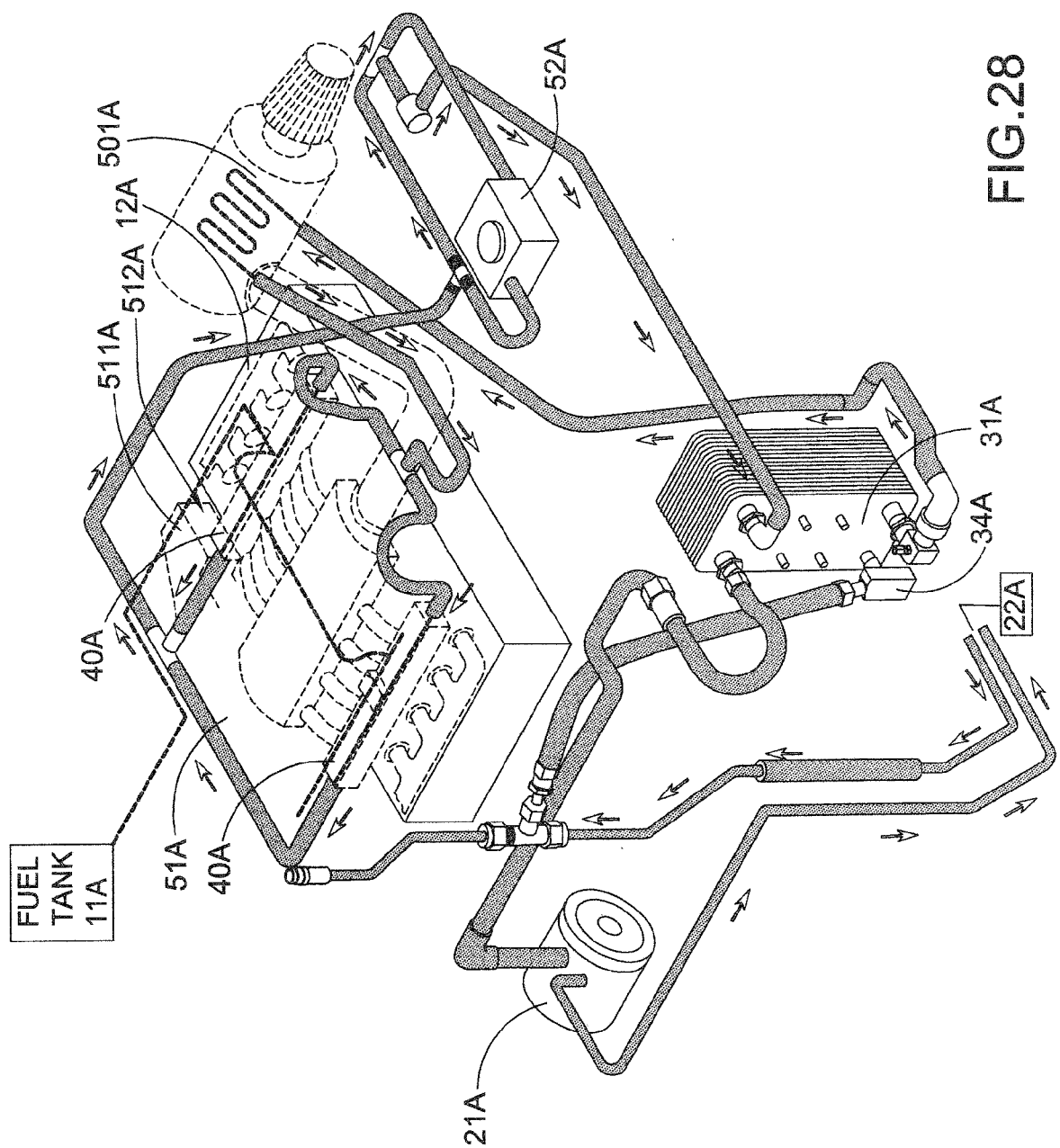
FIG. 28 shows a first alternative of the intake enhancement system for the air intake according to the above third embodiment of the present invention, illustrating the priority air cooling condition.

It is worth mentioning that the intake enhancement system of the present invention is able to cool the air only as shown in FIGS. 9 and 26, the fuel only as shown in FIG. 27, or the air and fuel together as shown in FIGS. 27 and 28.

As shown in FIG. 28, the intake enhancement system of the present invention is able to cool the air at the air inlet filter 501A and the fuel by the fuel rail 40A. Accordingly, FIG. 26 shows the priority "air" cooling condition that the cooling agent passes from the chiller bath 31A to the air inlet filter 501A and then to the fuel rail 40A. In other words, the air at the air inlet filter 501A will be cooled first before the fuel at the fuel rail 40A is cooled.

Figure 29:
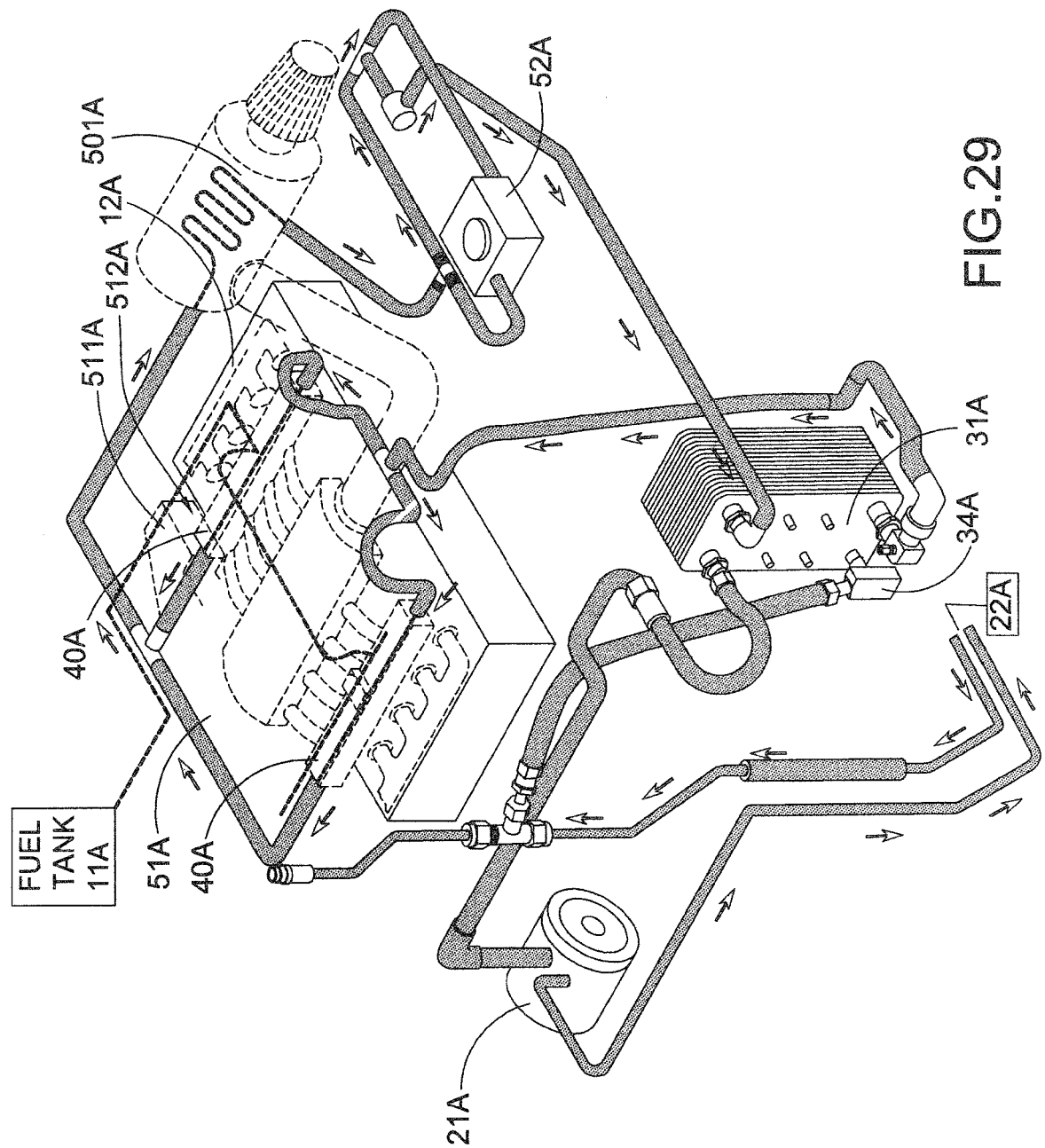
FIG. 29 shows a second alternative of the intake enhancement system for the air intake according to the above third embodiment of the present invention, illustrating the priority fuel cooling condition.

Likewise, when detouring the cooling line discharge section 331A of the cooling line 33A, the cooling agent will pass from the chiller bath 31A to the fuel rail 40A and then to the air inlet filter 501A. Accordingly, FIG. 29 shows the priority "fuel" cooling condition that the fuel at the fuel rail 40A will be cooled first before the air at the air inlet filter 501A is cooled.

Figure 30:
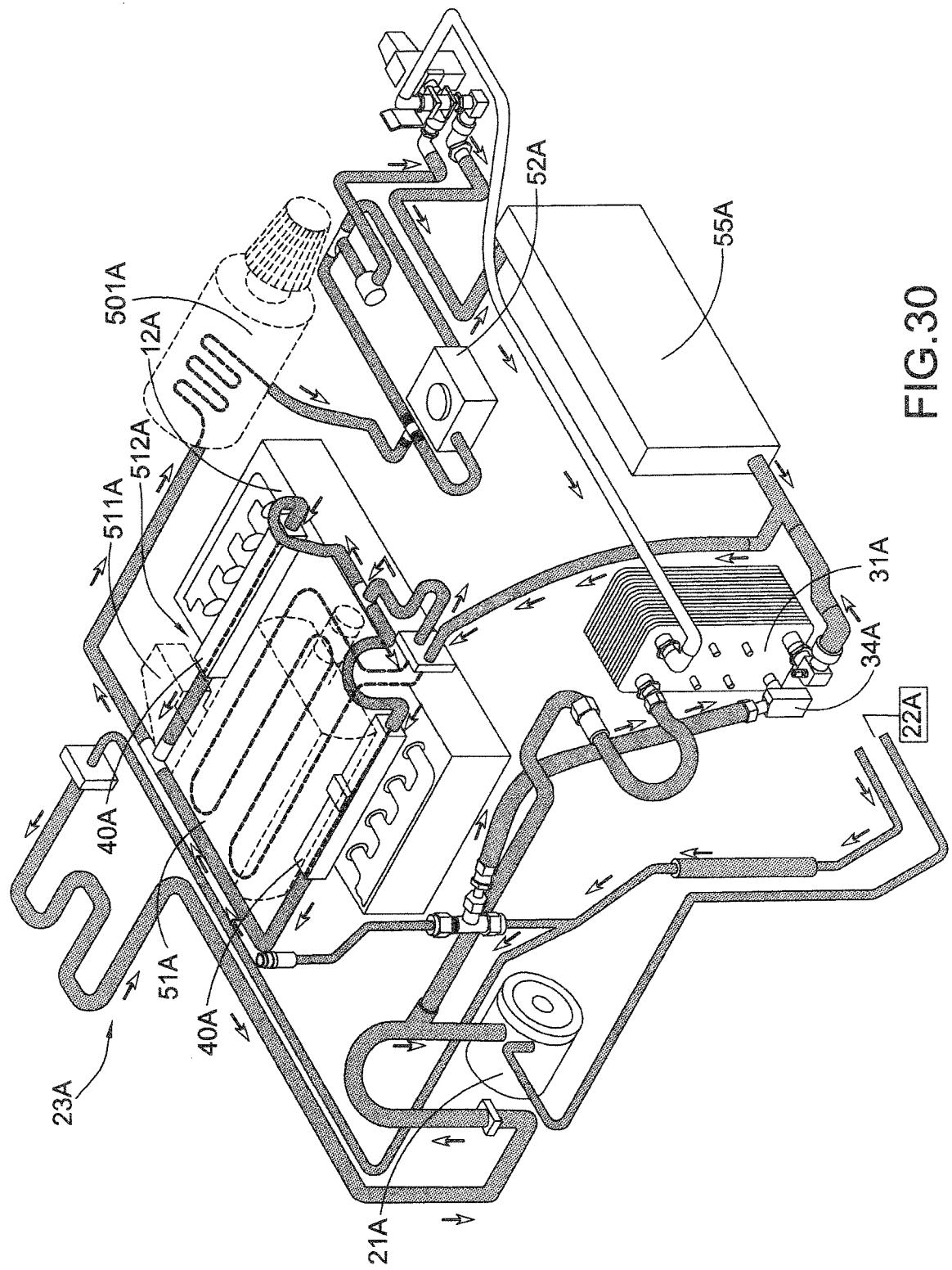
FIG. 30 shows the intake enhancement system incorporating with the intercooler, the fuel rail, and the air inlet filter according to the above third embodiment of the present invention.

The intake enhancement system of the present invention can also incorporate with both the intercooler 51A and the air inlet filter 501A at the same time. In addition, the fuel at the fuel rail 40A will also be cooled. As shown in FIGS. 30 to 31, the intercooler 51A, the fuel rail 40A, and the air inlet filter 501A are linked in a sequent order along the cooling line 33A, wherein the cooling agent is guide to flow at the intercooler 51A, the fuel rail 40A, and the air inlet filter 501A in a sequent order for cooling the air at the intercooler 51A, the fuel at the fuel rail 40A, and the air at the air inlet filter 501A respectively.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intake enhancement system for a vehicle having an internal combustion engine and a HVAC (Heating, Ventilation, and Air-Conditioning) system, comprising:
a chiller bath;
a delivery line operatively extended from said chiller bath for tapping at a heat exchanging line of said HVAC system to guide a heat exchanging agent flowing between said chiller bath and said HVAC system; and
a cooling line operatively extended from said chiller bath for guiding a cooling agent to flow from said chiller bath toward said internal combustion engine, wherein said chiller bath provides a heat-exchanging place for cooling said cooling agent by said heat exchanging agent in order to cool a combustion element by said cooling agent before said combustion element enters into said internal combustion engine.

2. The intake enhancement system, as recited in claim 1, wherein said cooling line, which is a cycling line, has a cooling line discharge section for discharging said cooling agent from said chiller bath toward said internal combustion engine, and a cooling line suction section for guiding said cooling agent back to said chiller bath from said internal combustion engine.

3. The intake enhancement system, as recited in claim 1, wherein said delivery line, which is a cycling line, has a discharge end arranged for being tapped at a suction section of said heat exchanging line for guiding said heat exchanging agent from said chiller bath, and a suction end arranged for being tapped at a discharge section of said heat exchanging line for guiding said heat exchanging agent to said chiller bath.

4. The intake enhancement system, as recited in claim 2, wherein said delivery line, which is a cycling line, has a discharge end arranged for being tapped at a suction section of said heat exchanging line for guiding said heat exchanging agent from said chiller bath, and a suction end arranged for being tapped at a discharge section of said heat exchanging line for guiding said heat exchanging agent to said chiller bath.

5. The intake enhancement system, as recited in 1, wherein said cooling line is extended from said chiller bath for operatively linking to an air intake of said vehicle in order to cool air as said combustion element before entering into said internal combustion engine.

6. The intake enhancement system, as recited in 4, wherein said cooling line is extended from said chiller bath for operatively linking to an air intake of said vehicle in order to cool air as said combustion element before entering into said internal combustion engine.

7. The intake enhancement system, as recited in claim 1, wherein said cooling line is extended from said chiller bath for operatively linking to a fuel line of said vehicle in order to cool fuel as said combustion element before entering into said internal combustion engine.

8. The intake enhancement system, as recited in claim 4, wherein said cooling line is extended from said chiller bath for operatively linking to a fuel line of said vehicle in order to cool fuel as said combustion element before entering into said internal combustion engine.

9. The intake enhancement system, as recited in claim 7, further comprising a fuel rail having a fuel-engine channel arranged for operatively linking to said fuel line to guide said fuel to flow from said fuel line into said internal combustion engine, and a cooling agent channel operatively linked to said cooling line for guiding said cooling agent to flow through said cooling agent channel in order to heat-exchange said fuel with said cooling agent before said fuel enters into said internal combustion engine.

10. The intake enhancement system, as recited in claim 8, further comprising a fuel rail having a fuel-engine channel arranged for operatively linking to said fuel line to guide said fuel to flow from said fuel line into said internal combustion engine, and a cooling agent channel operatively linked to said cooling line for guiding said cooling agent to flow through said cooling agent channel in order to heat-exchange said fuel with said cooling agent before said fuel enters into said internal combustion engine.

11. The intake enhancement system, as recited in claim 1, wherein said cooling line further has a suction end tapped at said cooling line for guiding said cooling agent from said chiller bath to a "liquid to air" heat exchanger of said vehicle, and a discharge end tapped at said cooling line for guiding said cooling agent back to said chiller bath from said "liquid to air" heat exchanger of said vehicle, so as to enable said cooling agent being cooled at said "liquid to air" heat exchanger.

12. The intake enhancement system, as recited in claim 4, wherein said cooling line further has a suction end tapped at said cooling line for guiding said cooling agent from said chiller bath to a "liquid to air" heat exchanger of said vehicle, and a discharge end tapped at said cooling line for guiding said cooling agent back to said chiller bath from said "liquid to air" heat exchanger of said vehicle, so as to enable said cooling agent being cooled at said "liquid to air" heat exchanger.

13. The intake enhancement system, as recited in claim 11, further comprising a three-way actuator valve operatively linked at said cooling line for selectively guiding a flow direction of said cooling agent, wherein said three-way actuator valve is actuated for only allowing said cooling agent to flow toward said "liquid to air" heat exchanger when said HVAC system is switched off, wherein said three-way actuator valve is actuated for ensuring said cooling agent to only flow back to said chiller bath without passing through said "liquid to air" heat exchanger when said HVAC system is switched on.

14. The intake enhancement system, as recited in claim 12, further comprising a three-way actuator valve operatively linked at said cooling line for selectively guiding a flow direction of said cooling agent, wherein said three-way actuator valve is actuated for only allowing said cooling agent to flow toward said "liquid to air" heat exchanger when said HVAC system is switched off, wherein said three-way actuator valve is actuated for ensuring said cooling agent to only flow back to said chiller bath without passing through said "liquid to air" heat exchanger when said HVAC system is switched on.

15. The intake enhancement system, as recited in claim 1, further comprising a cabin cycling solenoid valve adapted for operatively providing at said heat exchanging line between a condenser and an evaporator of said HVAC system, wherein said cabin cycling solenoid valve is energized to be opened for regulating said heat exchanging agent to flow from said condenser to said evaporator and to flow from said condenser to said chiller bath, wherein said cabin cycling solenoid valve is de-energized to be closed for stopping said heat exchanging agent to flow from said condenser to said evaporator and for only allowing said heat exchanging agent to flow from said condenser to said chiller bath.

16. The intake enhancement system, as recited in claim 4, further comprising a cabin cycling solenoid valve adapted for operatively providing at said heat exchanging line between a condenser and an evaporator of said HVAC system, wherein said cabin cycling solenoid valve is energized to be opened for regulating said heat exchanging agent to flow from said condenser to said evaporator and to flow from said condenser to said chiller bath, wherein said cabin cycling solenoid valve is de-energized to be closed for stopping said heat exchanging agent to flow from said condenser to said evaporator and for only allowing said heat exchanging agent to flow from said condenser to said chiller bath.

17. The intake enhancement system, as recited in claim 15, further comprising a high pressure cut out switch operatively linked to said cabin cycling solenoid valve for splitting said heat exchanging agent into two different directions, wherein when said cabin cycling solenoid valve is opened, said high pressure cut out switch is actuated for allowing said heat exchanging agent to flow to said evaporator and said chiller bath at the same time, wherein when said cabin cycling solenoid valve is closed, said high pressure cut out switch is actuated for only allowing said heat exchanging agent to flow to said chiller bath.

18. The intake enhancement system, as recited in claim 16, further comprising a high pressure cut out switch operatively linked to said cabin cycling solenoid valve for splitting said heat exchanging agent into two different directions, wherein when said cabin cycling solenoid valve is opened, said high pressure cut out switch is actuated for allowing said heat exchanging agent to flow to said evaporator and said chiller bath at the same time, wherein when said cabin cycling solenoid valve is closed, said high pressure cut out switch is actuated for only allowing said heat exchanging agent to flow to said chiller bath.

19. The intake enhancement system, as recited in claim 1, wherein said cooling agent is glycol.

20. The intake enhancement system, as recited in claim 4, wherein said cooling agent is glycol.

21. A method of enhancing an efficiency of an internal combustion engine of a vehicle, the vehicle including a HVAC (Heating, Ventilation, and Air-Conditioning) system, the method comprising the steps of:
  (a) operatively linking a delivery line at a heat exchanging line of said HVAC system to guide a heat exchanging agent flowing between a chiller bath and said HVAC system;
  (b) operatively linking a cooling line to said chiller bath for guiding a cooling agent to flow from said chiller bath toward said internal combustion engine;
  (c) enabling a heat exchange between said cooling agent and said heat exchanging agent at said chiller bath; and
  (d) cooling a combustion element by said cooling agent before said combustion element enters into said internal combustion engine.

22. The method, as recited in claim 21, wherein the step (b) further comprises the steps of:
  providing a cooling line discharge section of said cooling line for discharging said cooling agent from said chiller bath toward said internal combustion engine;
  providing a cooling line suction section of said cooling line for guiding said cooling agent back to said chiller bath from said internal combustion engine; and
  configuring said cooling line as a cycling line to cycle said cooling agent between said chiller bath and said internal combustion engine via said cooling line discharge section and said cooling line suction section of said cooling line.

23. The method, as recited in claim 21, wherein the step (a) further comprising the steps of:
  tapping a discharge end of said delivery line at a suction section of said heat exchanging line for guiding said heat exchanging agent from said chiller bath;
  tapping a suction end of said delivery line at a discharge section of said heat exchanging line for guiding said heat exchanging agent to said chiller bath; and configuring said delivery line as a cycling line to cycle said heat exchanging agent between said chiller bath and said HVAC system.

24. The method, as recited in claim 22, wherein the step (a) further comprising the steps of:
  tapping a discharge end of said delivery line at a suction section of said heat exchanging line for guiding said heat exchanging agent from said chiller bath;
  tapping a suction end of said delivery line at a discharge section of said heat exchanging line for guiding said heat exchanging agent to said chiller bath; and
  configuring said delivery line as a cycling line to cycle said heat exchanging agent between said chiller bath and said HVAC system.

25. The method as recited in claim 21 wherein, in the step (b), said cooling line is extended from said chiller bath for operatively linking to an air intake of said vehicle in order to cool air as said combustion element before entering into said internal combustion engine.

26. The method as recited in claim 24 wherein, in the step (b), said cooling line is extended from said chiller bath for operatively linking to an air intake of said vehicle in order to cool air as said combustion element before entering into said combustion engine.

27. The method as recited in claim 21 wherein, in the step (b), said cooling line is extended from said chiller bath for operatively linking to a fuel line of said vehicle in order to cool fuel as said combustion element before entering into said internal combustion engine.

28. The method as recited in claim 24 wherein, in the step (b), said cooling line is extended from said chiller bath for operatively linking to a fuel line of said vehicle in order to cool fuel as said combustion element before entering into said internal combustion engine.

29. The method, as recited in claim 27, wherein the step (b) further comprises the steps of:
  operatively linking a fuel-engine channel of a fuel rail to said fuel line to guide said fuel to flow from said fuel line into said internal combustion engine; and
  operatively linking a cooling agent channel of said fuel rail to said cooling line for guiding said cooling agent to flow through said cooling agent channel in order to heat-exchange said fuel with said cooling agent before said fuel enters into said internal combustion engine.

30. The method, as recited in claim 28, wherein the step (b) further comprises the steps of:
  operatively linking a fuel-engine channel of a fuel rail to said fuel line to guide said fuel to flow from said fuel line into said internal combustion engine; and
  operatively linking a cooling agent channel of said fuel rail to said cooling line for guiding said cooling agent to flow through said cooling agent channel in order to heat-exchange said fuel with said cooling agent before said fuel enters into said internal combustion engine.

31. The method, as recited in claim 21, wherein the step (b) further comprises the steps of:
  tapping a suction end at said cooling line for guiding said cooling agent from said chiller bath to a "liquid to air" heat exchanger of said vehicle, and
  tapping a discharge end at said cooling line for guiding said cooling agent back to said chiller bath from said "liquid to air" heat exchanger of said vehicle, so as to enable said cooling agent being cooled at said "liquid to air" heat exchanger.

32. The method, as recited in claim 24, wherein the step (b) further comprises the steps of:
  tapping a suction end at said cooling line for guiding said cooling agent from said chiller bath to a "liquid to air" heat exchanger of said vehicle, and
  tapping a discharge end at said cooling line for guiding said cooling agent back to said chiller bath from said "liquid to air" heat exchanger of said vehicle, so as to enable said cooling agent being cooled at said "liquid to air" heat exchanger.

33. The method, as recited in claim 31, wherein the step (b) further comprises the steps of:
  selectively guiding a flow direction of said cooling agent via a three-way actuator valve which is operatively linked at said cooling line;
  when said HVAC system is switched off, actuating said three-way actuator valve for only allowing said cooling agent to flow toward said "liquid to air" heat exchanger; and
  when said HVAC system is switched on, actuating said three-way actuator valve for ensuring said cooling agent to only flow back to said chiller bath without passing through said "liquid to air" heat exchanger.

34. The method, as recited in claim 32, wherein the step (b) further comprises the steps of:
  selectively guiding a flow direction of said cooling agent via a three-way actuator valve which is operatively linked at said cooling line;
  when said HVAC system is switched off, actuating said three-way actuator valve for only allowing said cooling agent to flow toward said "liquid to air" heat exchanger; and
  when said HVAC system is switched on, actuating said three-way actuator valve for ensuring said cooling agent to only flow back to said chiller bath without passing through said "liquid to air" heat exchanger.

35. The method, as recited in claim 21, further comprising a step of guiding a flow direction of said heat exchanging agent via a cabin cycling solenoid valve by the steps of:
  operatively providing said cabin cycling solenoid valve at said heat exchanging line between a condenser and an evaporator of said HVAC system;
  opening said cabin cycling solenoid valve for regulating said heat exchanging agent to flow from said condenser to said evaporator and to flow from said condenser to said chiller bath; and
  closing said cabin cycling solenoid valve for stopping said heat exchanging agent to flow from said condenser to said evaporator and for only allowing said heat exchanging agent to flow from said condenser to said chiller bath.

36. The method, as recited in claim 24, further comprising a step of guiding a flow direction of said heat exchanging agent via a cabin cycling solenoid valve by the steps of:
  operatively providing said cabin cycling solenoid valve at said heat exchanging line between a condenser and an evaporator of said HVAC system;
  opening said cabin cycling solenoid valve for regulating said heat exchanging agent to flow from said condenser to said evaporator and to flow from said condenser to said chiller bath; and
  closing said cabin cycling solenoid valve for stopping said heat exchanging agent to flow from said condenser to said evaporator and for only allowing said heat exchanging agent to flow from said condenser to said chiller bath.

37. The method, as recited in claim 35, wherein the guiding step further comprises the steps of:
  operatively linking a high pressure cut out switch to said cabin cycling solenoid valve for splitting said heat exchanging agent into two different directions;

when said cabin cycling solenoid valve is opened, actuating said high pressure cut out switch for allowing said heat exchanging agent to flow to said evaporator and said chiller bath at the same time;

when said cabin cycling solenoid valve is closed, actuating said high pressure cut out switch for only allowing said heat exchanging agent to flow to said chiller bath.

38. The method, as recited in claim 36, wherein the guiding step further comprises the steps of:

operatively linking a high pressure cut out switch to said cabin cycling solenoid valve for splitting said heat exchanging agent into two different directions;

when said cabin cycling solenoid valve is opened, actuating said high pressure cut out switch for allowing said heat exchanging agent to flow to said evaporator and said chiller bath at the same time;

when said cabin cycling solenoid valve is closed, actuating said high pressure cut out switch for only allowing said heat exchanging agent to flow to said chiller bath.

39. The method, as recited in claim 21, wherein said cooling agent is glycol and said heat exchanging agent is refrigerant.

40. The method, as recited in claim 24, wherein said cooling agent is glycol and said heat exchanging agent is refrigerant.

* * * * *